United States Patent
Wang et al.

(10) Patent No.: US 10,779,242 B2
(45) Date of Patent: Sep. 15, 2020

(54) POWER CONTROL FOR OVERLAPPING SIDELINK AND UPLINK TRANSMISSIONS

(71) Applicant: Samsung Electronics Co., Ltd., Gyeonggi-do (KR)

(72) Inventors: Yi Wang, Beijing (CN); Yingyang Li, Beijing (CN); Shichang Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/338,560

(22) PCT Filed: Sep. 29, 2017

(86) PCT No.: PCT/KR2017/011058
§ 371 (c)(1),
(2) Date: Apr. 1, 2019

(87) PCT Pub. No.: WO2018/062969
PCT Pub. Date: Apr. 5, 2018

(65) Prior Publication Data
US 2019/0253977 A1    Aug. 15, 2019

(30) Foreign Application Priority Data

Sep. 30, 2016 (CN) .......................... 2016 1 0875507
Oct. 10, 2016 (CN) .......................... 2016 1 0884698
(Continued)

(51) Int. Cl.
*H04W 52/14* (2009.01)
*H04W 52/38* (2009.01)
(Continued)

(52) U.S. Cl.
CPC ......... *H04W 52/146* (2013.01); *H04W 52/16* (2013.01); *H04W 52/281* (2013.01);
(Continued)

(58) Field of Classification Search
CPC . H04W 52/146; H04W 52/16; H04W 52/281; H04W 52/367; H04W 52/383; H04W 72/0473; H04W 72/10
(Continued)

(56) References Cited

U.S. PATENT DOCUMENTS

2013/0324182 A1    12/2013    Deng et al.
2016/0081039 A1    3/2016    Lindoff et al.
(Continued)

FOREIGN PATENT DOCUMENTS

| EP | 2 995 155 | 3/2016 |
|---|---|---|
| WO | WO 2016/089185 | 6/2016 |
| WO | WO 2016/122192 | 8/2016 |

OTHER PUBLICATIONS

PCT/ISA/210 Search Report issued on PCT/KR2017/011058, pp. 3.
(Continued)

*Primary Examiner* — Philip Sobutka
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method and a device of power control for a Uu uplink transmission and a V2X transmission. Specifically, the present disclosure provides a method for determining the transmission power based on the circumstance of synchronous/asynchronous carriers, a minimum time delay of preparing the transmis-
(Continued)

sion power of the V2X and Uu uplink transmission, and an actual time delay of V2X from a resource reselection to a transmission. By this method, the transmission efficiency of the V2X and the Uu uplink transmission can be ensured.

10 Claims, 22 Drawing Sheets

(30) Foreign Application Priority Data

Oct. 11, 2016 (CN) .......................... 2016 1 0889199
Oct. 27, 2016 (CN) .......................... 2016 1 0957775

(51) Int. Cl.
*H04W 52/28* (2009.01)
*H04W 52/36* (2009.01)
*H04W 52/16* (2009.01)
*H04W 72/04* (2009.01)
*H04W 72/10* (2009.01)

(52) U.S. Cl.
CPC ....... *H04W 52/367* (2013.01); *H04W 52/383* (2013.01); *H04W 72/0473* (2013.01); *H04W 72/10* (2013.01)

(58) Field of Classification Search
USPC .......................................................... 455/522
See application file for complete search history.

(56) References Cited

U.S. PATENT DOCUMENTS

| 2016/0142898 | A1 | 5/2016 | Poitau et al. |
| 2016/0157185 | A1 | 6/2016 | Chae et al. |
| 2017/0367087 | A1* | 12/2017 | Seo ....................... H04W 72/02 |
| 2018/0007494 | A1 | 1/2018 | Yi et al. |

OTHER PUBLICATIONS

PCT/ISA/237 Written Opinion issued on PCT/KR2017/011058, pp. 6.
ZTE, 3GPP TSG RAN WG1 Meeting #86, R1-166983, Gothenburg, Sweden Aug. 12, 2016, Co-existence of PC5-based V2V operation and legacy Uu operation, pp. 5.
NTT DOCOMO, 3GPP TSG RAN WG1 Meeting #86, R1-167360, Gothenburg, Sweden Aug. 12, 2016, Details of prioritizing sidelink transmissions over UL transmissions, pp. 5.
Qualcomm Incorporated, 3GPP TSG-RAN WG1 #86, R1-166263, Gothenburg, Sweden Aug. 13, 2016, Co-existence of PC5 and Uu for V2V, pp. 5.
3GPP, "3rd Generation Partnership Project; Technical Specification Group Radio Access Network; Evolved Universal Terrestrial Radio Access (E-UTRA); Physical Layer Procedures (Release 14)", 3GPP Standard, XP051172658, Sep. 29, 2016, 51 pages (pp. 345-395).
European Search Report dated Aug. 21, 2019 issued in counterpart application No. 17856855.6-1219, 10 pages.

* cited by examiner

[Fig. 1]
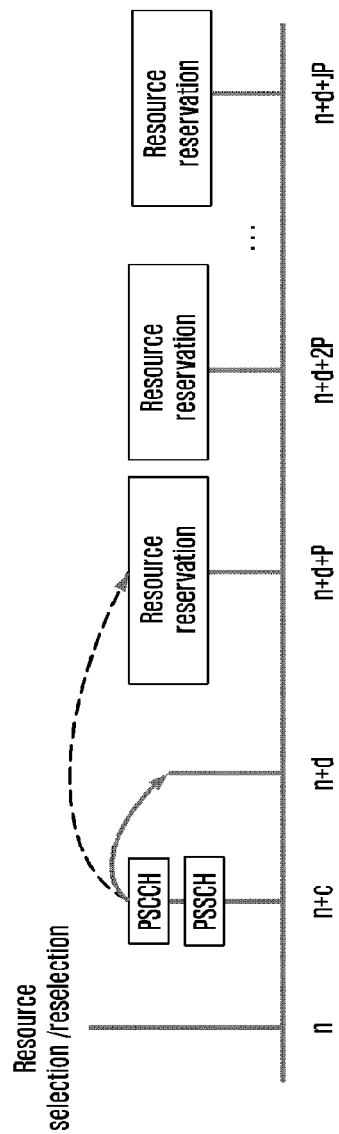

[Fig. 2]
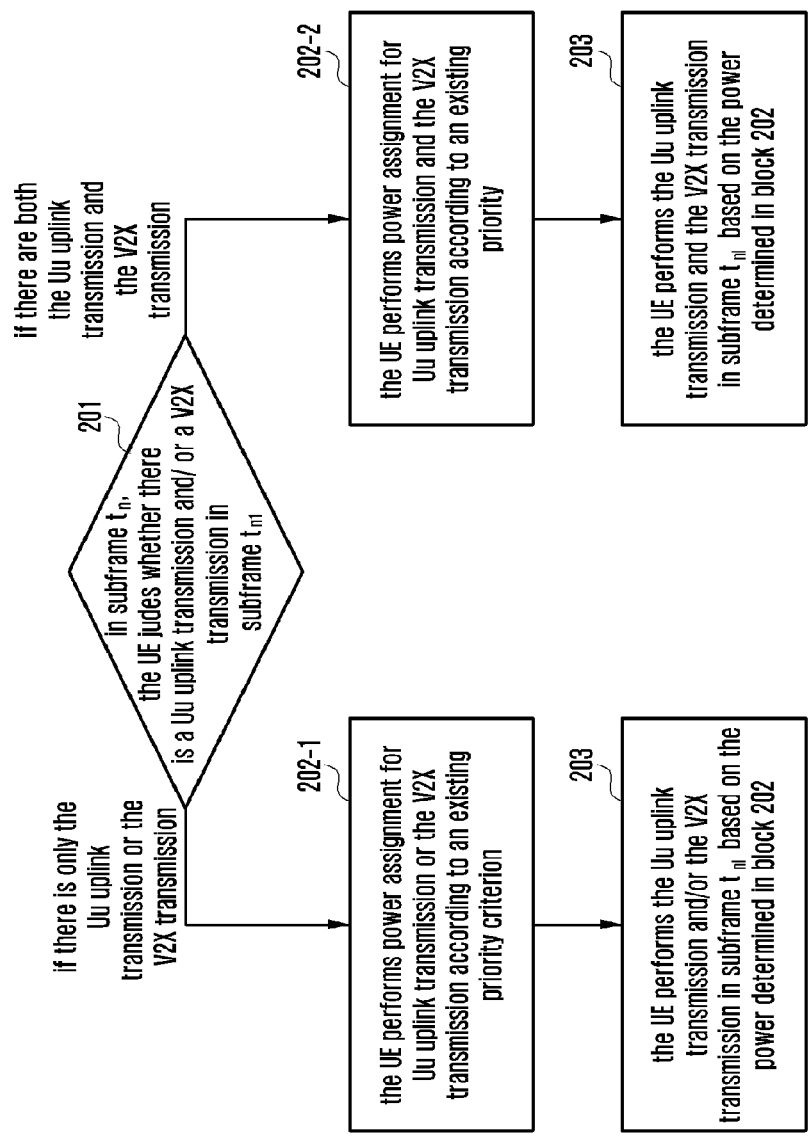

[Fig. 3]
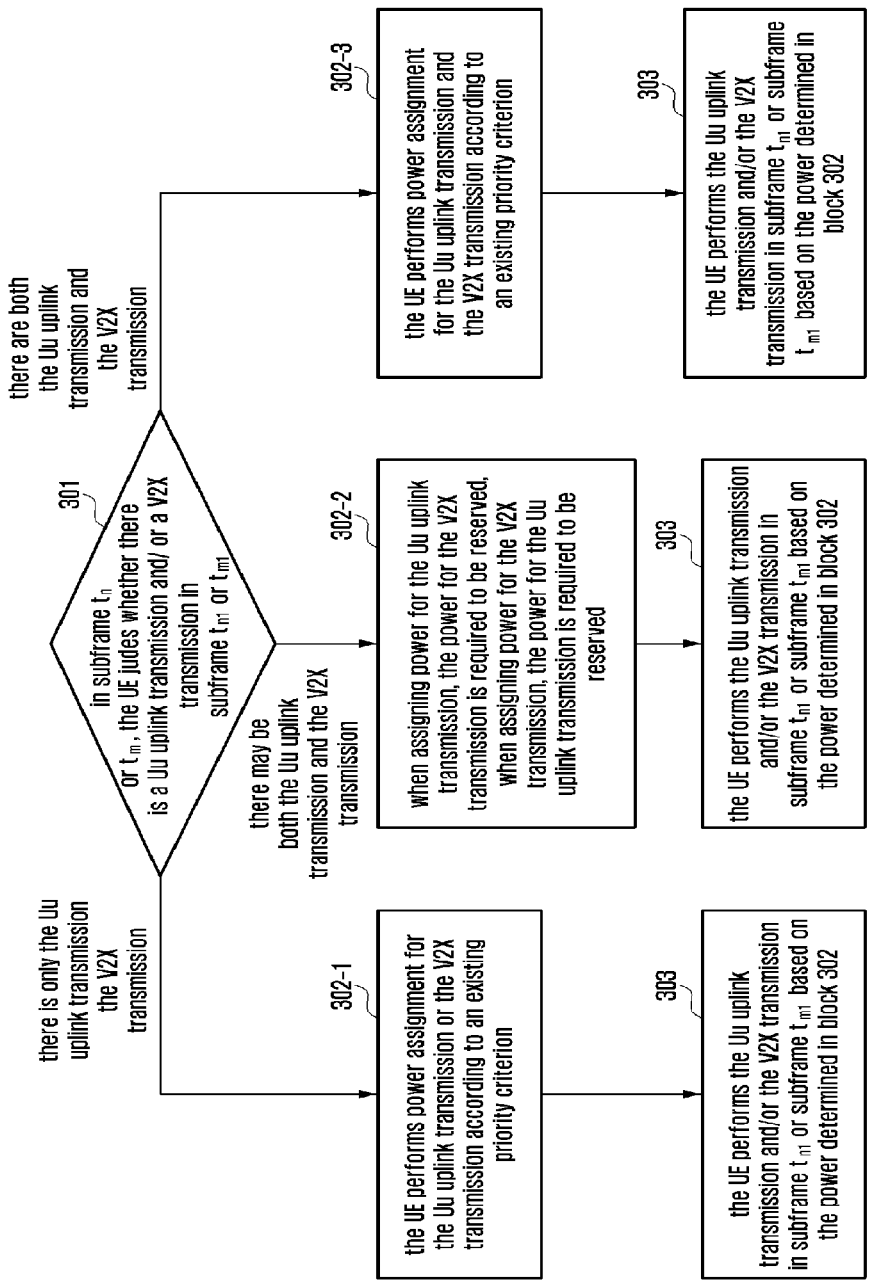

[Fig. 4]
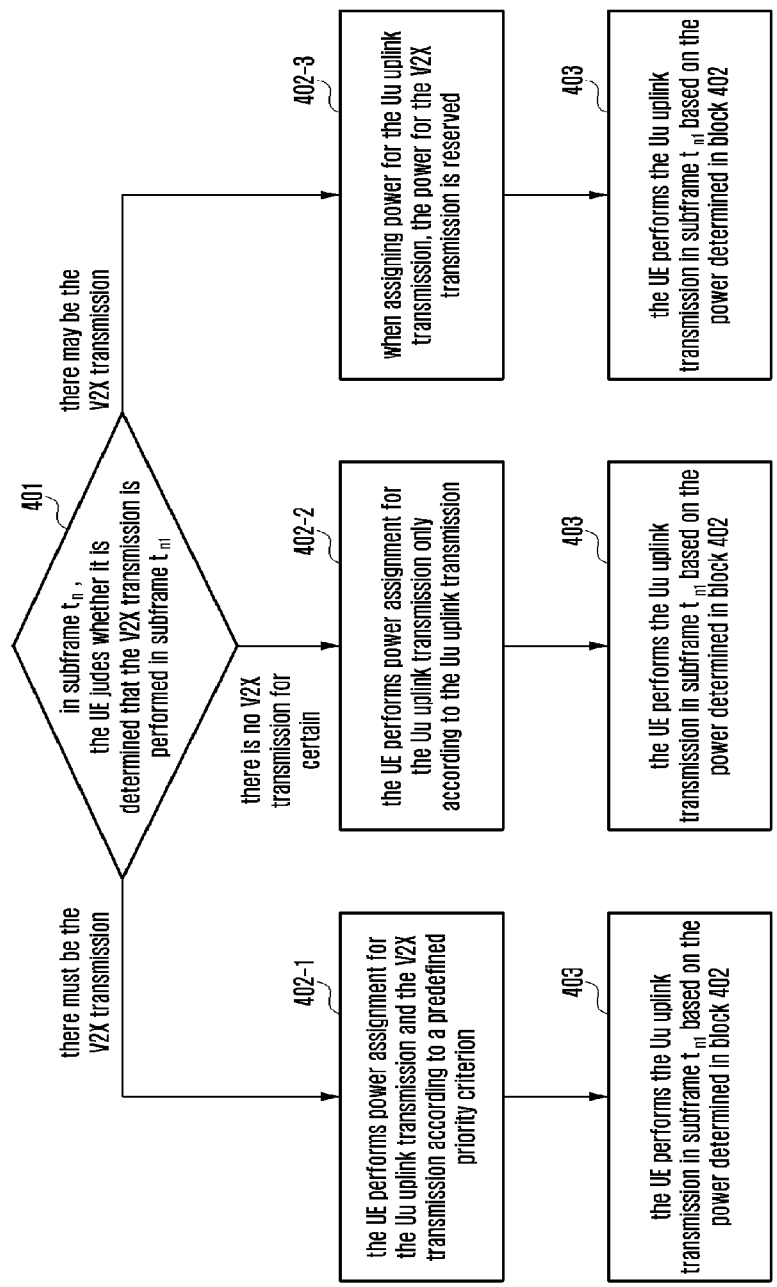

[Fig. 5]
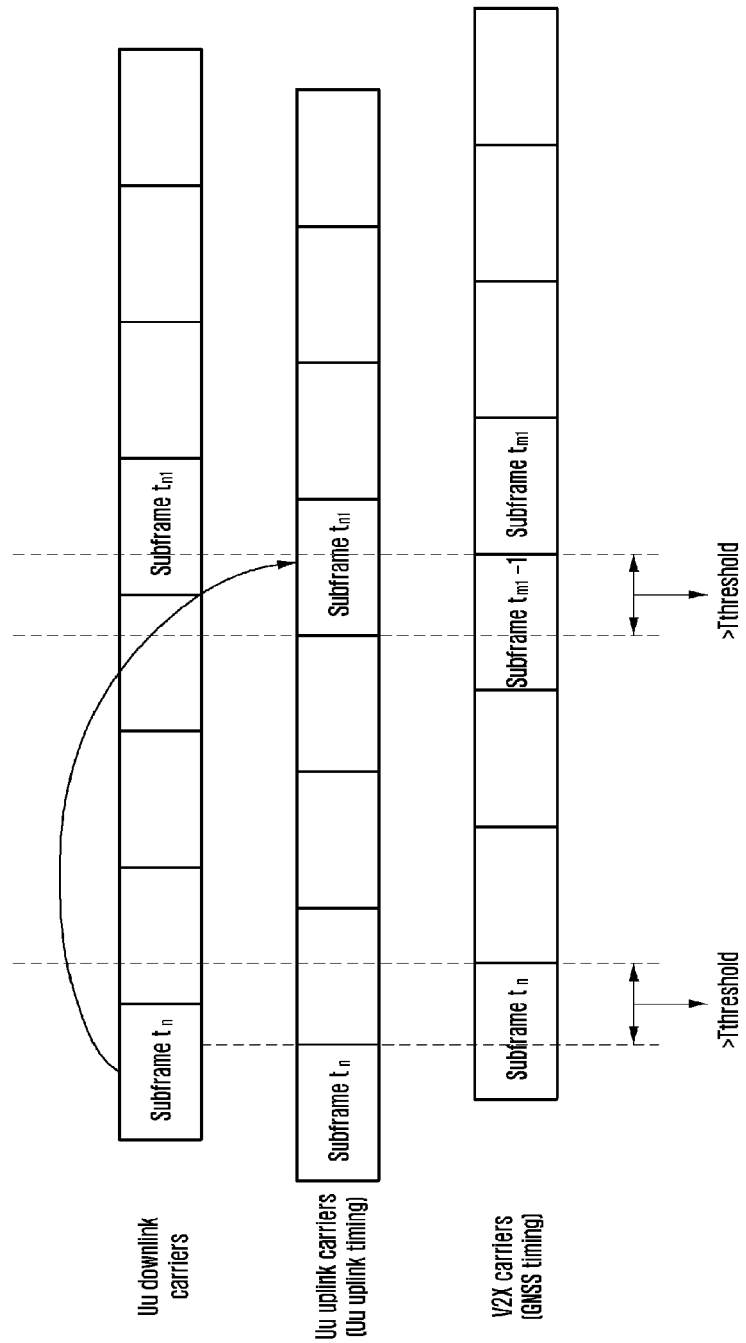

[Fig. 6]
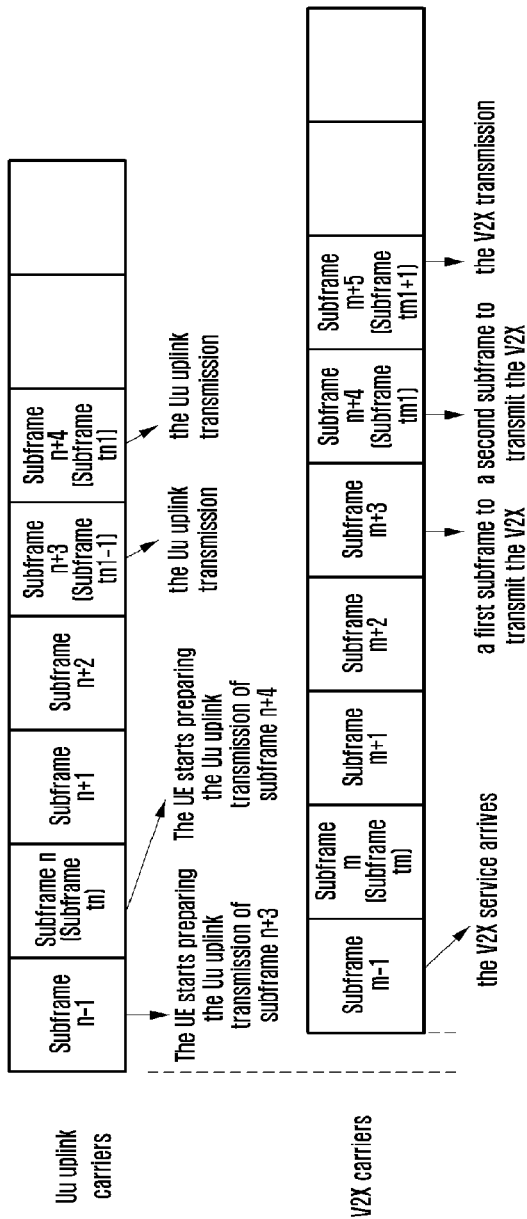

[Fig. 7]
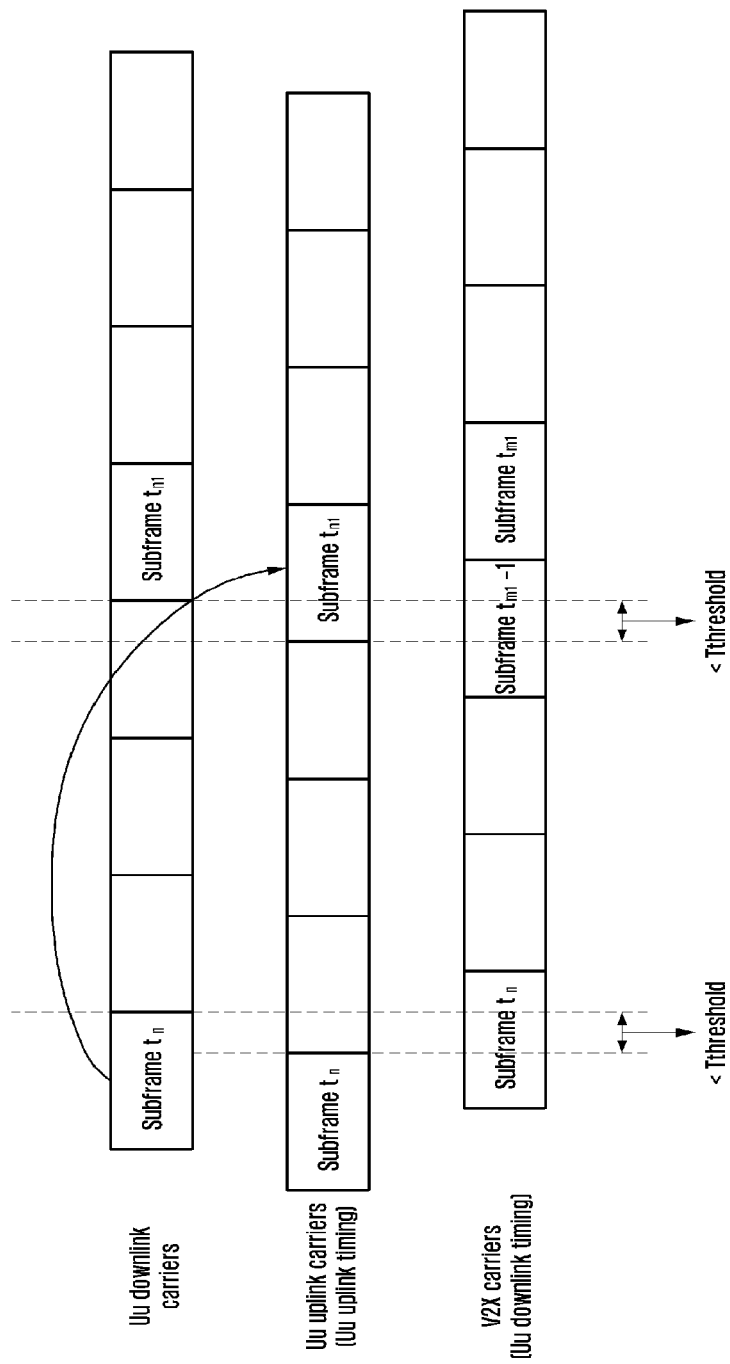

[Fig. 8]
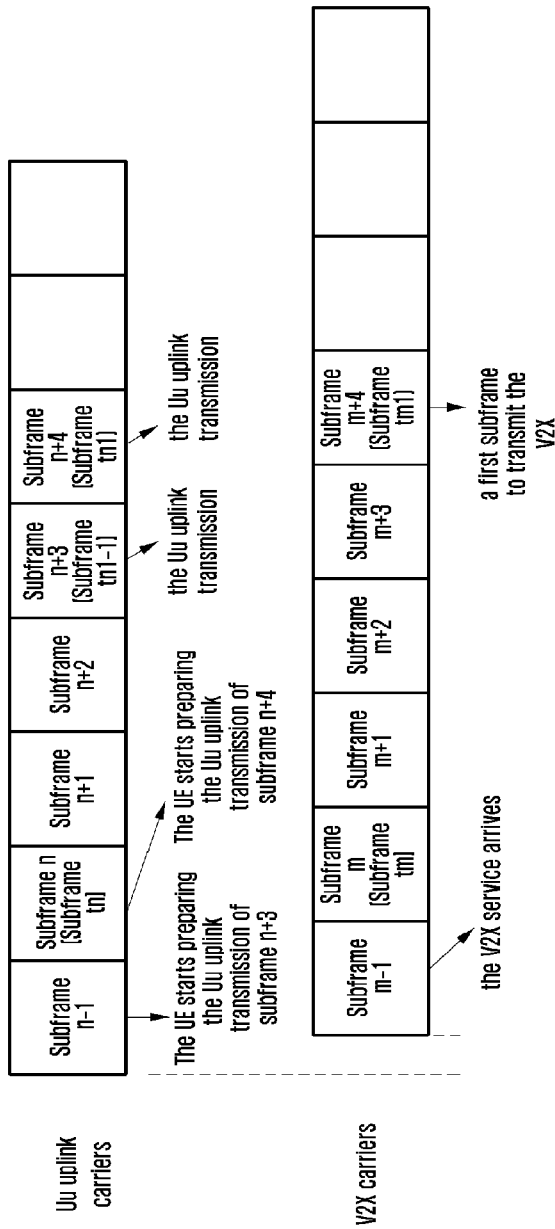

[Fig. 9]
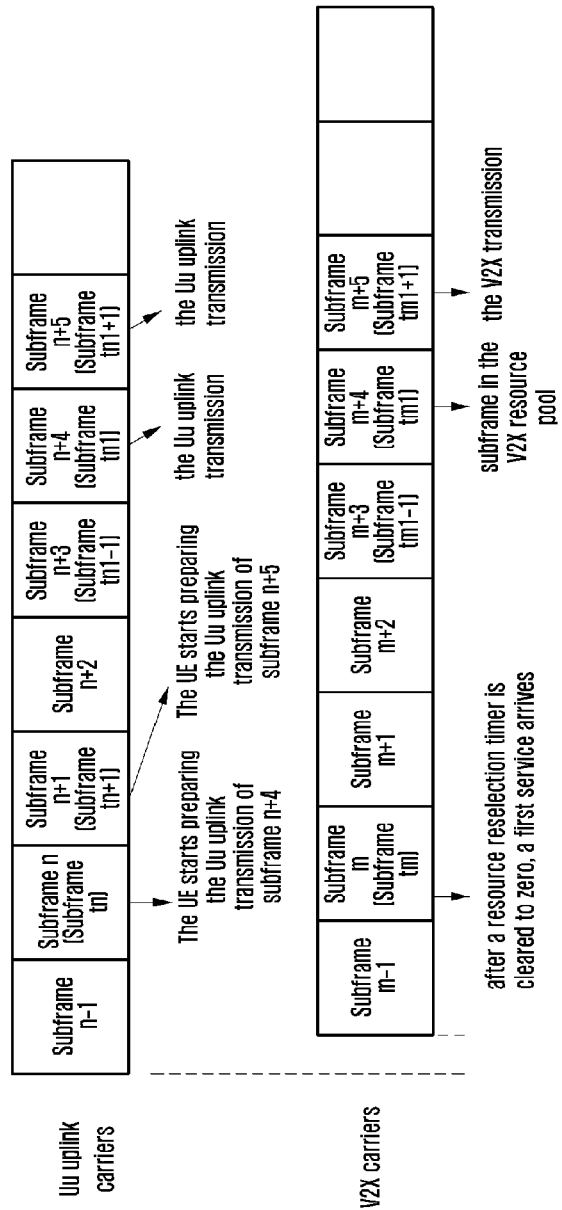

[Fig. 10]
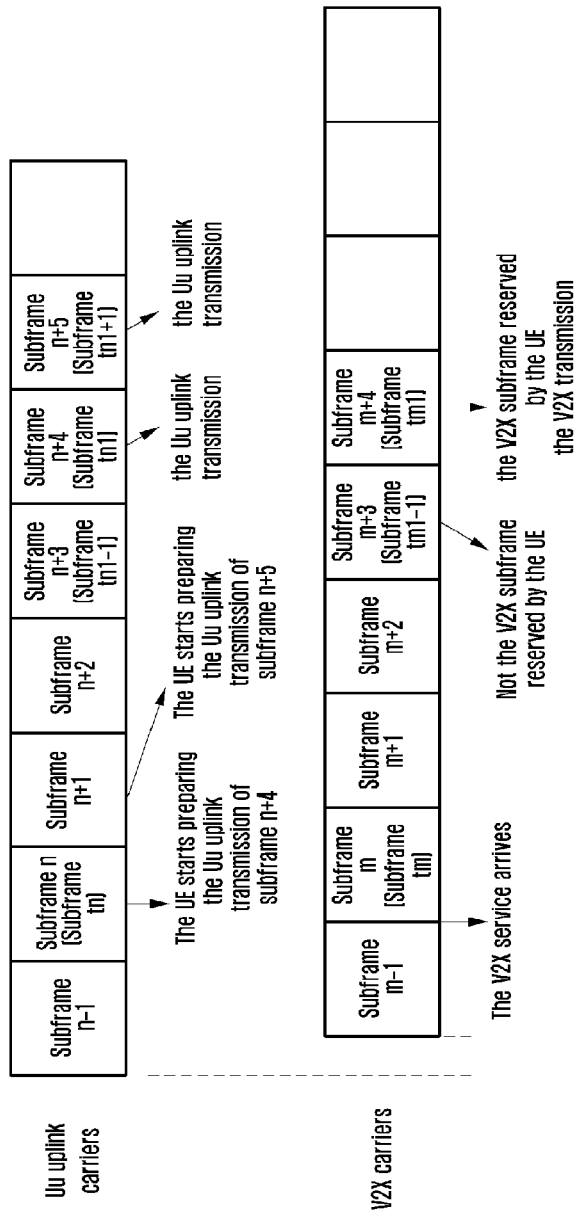

[Fig. 11]
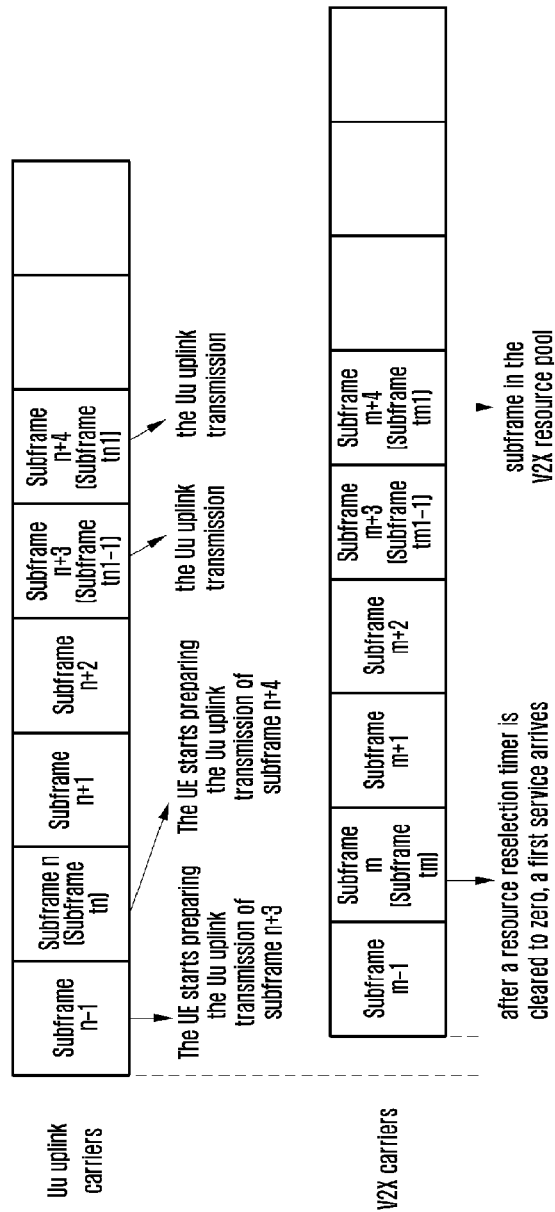

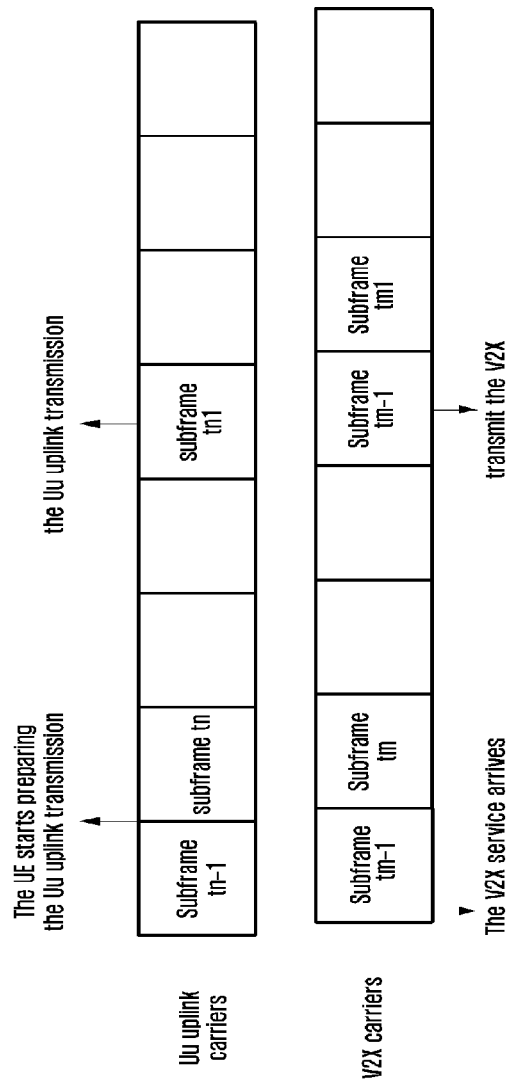
[Fig. 12]

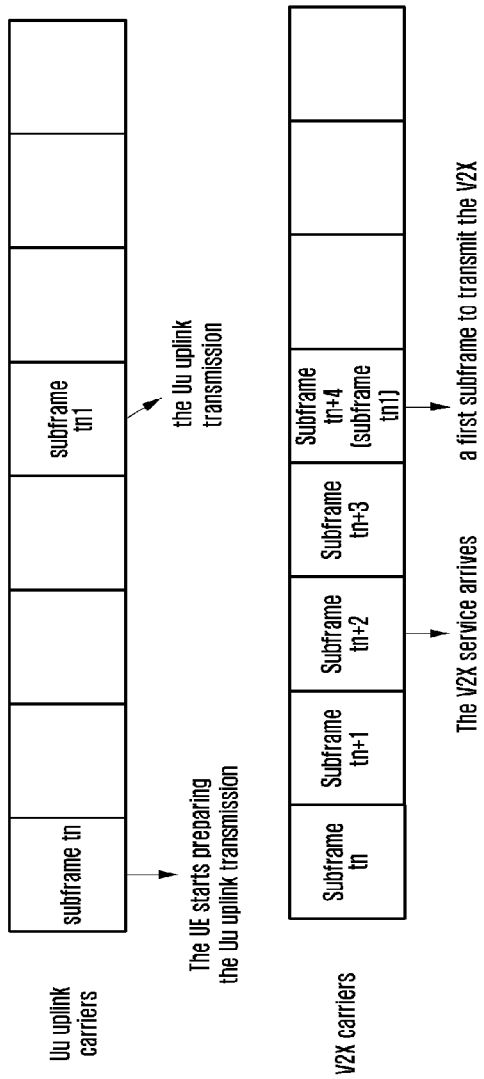
[Fig. 13]

[Fig. 14]
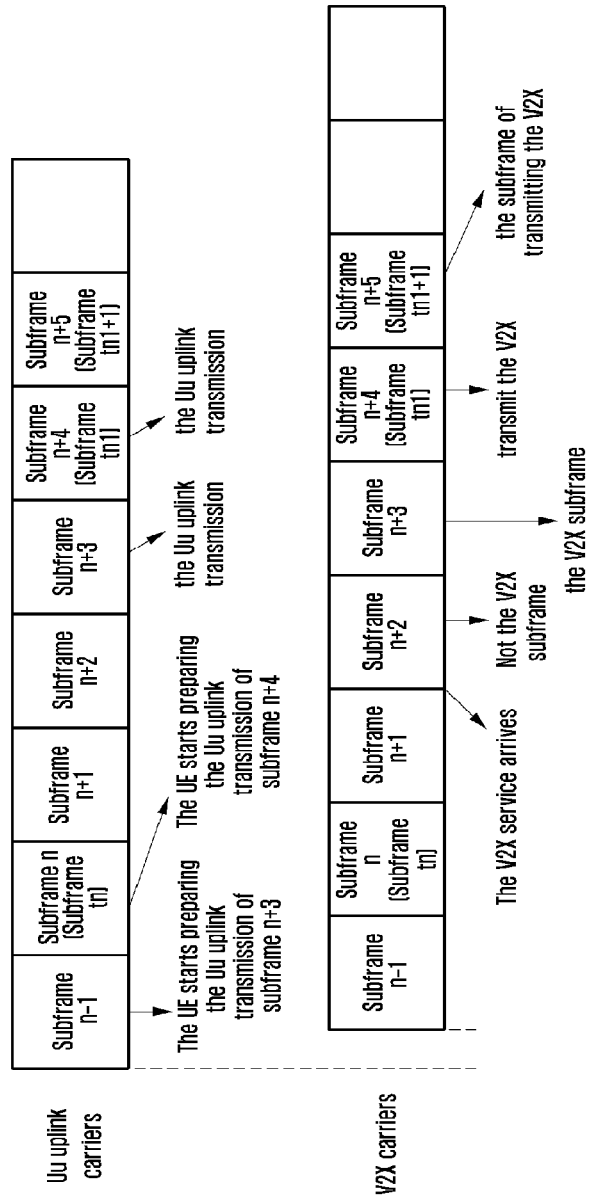

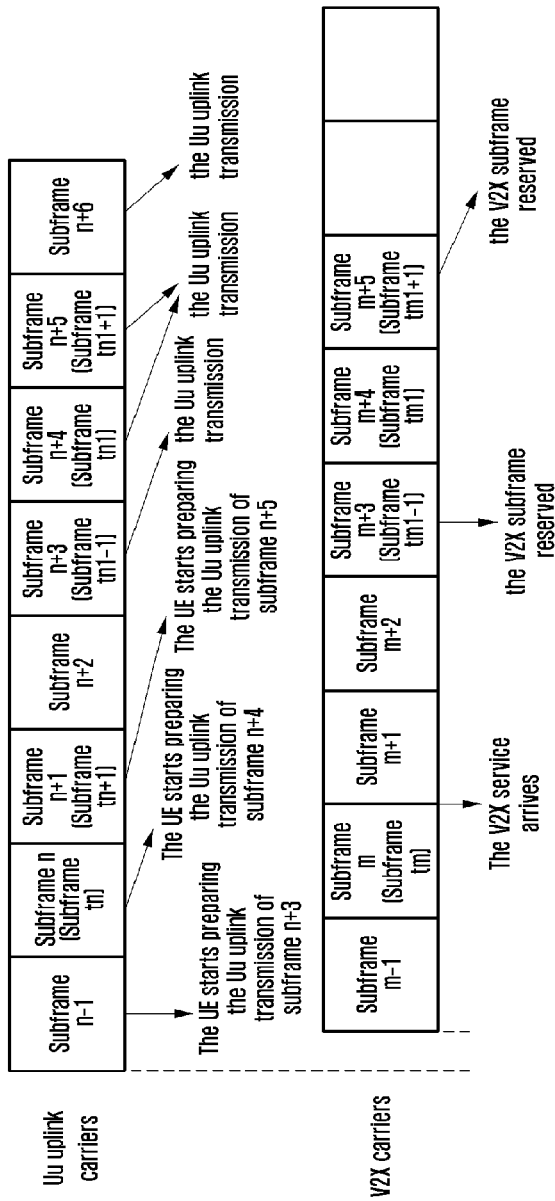
[Fig. 15]

[Fig. 16]
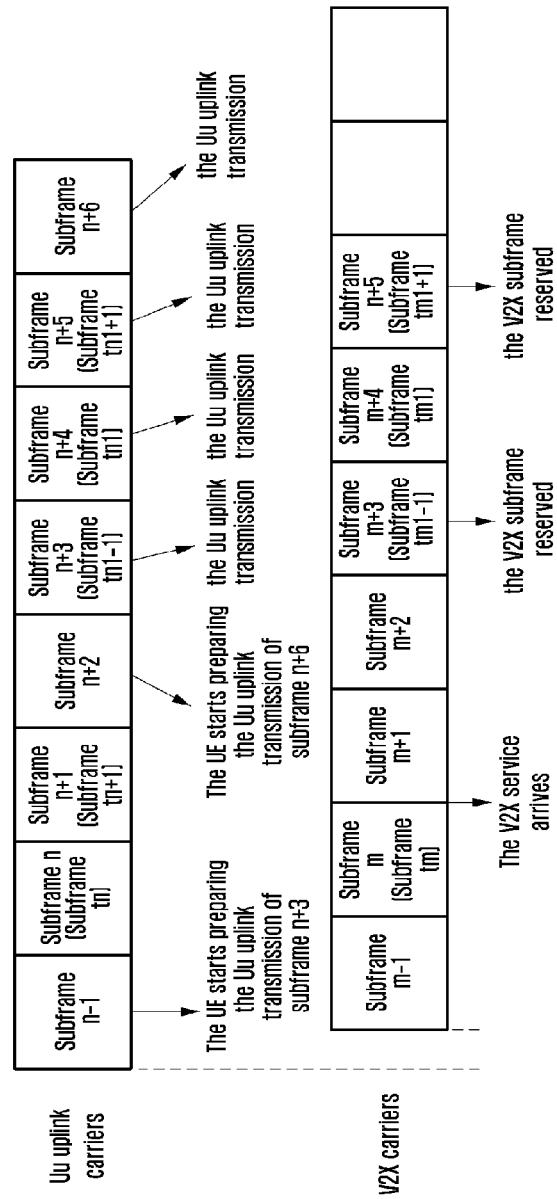

[Fig. 17]
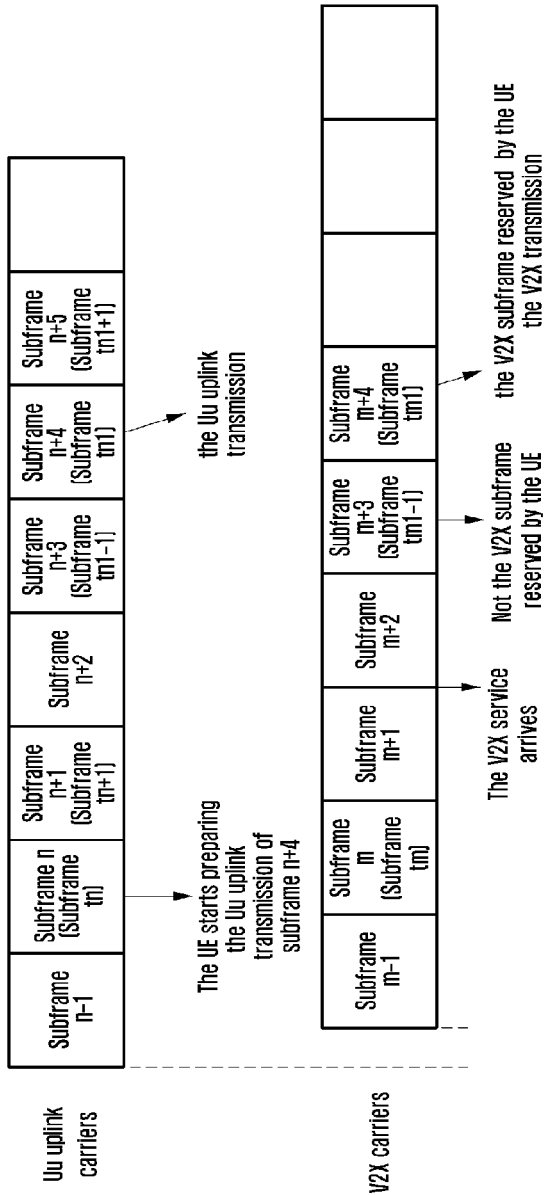

[Fig. 18]
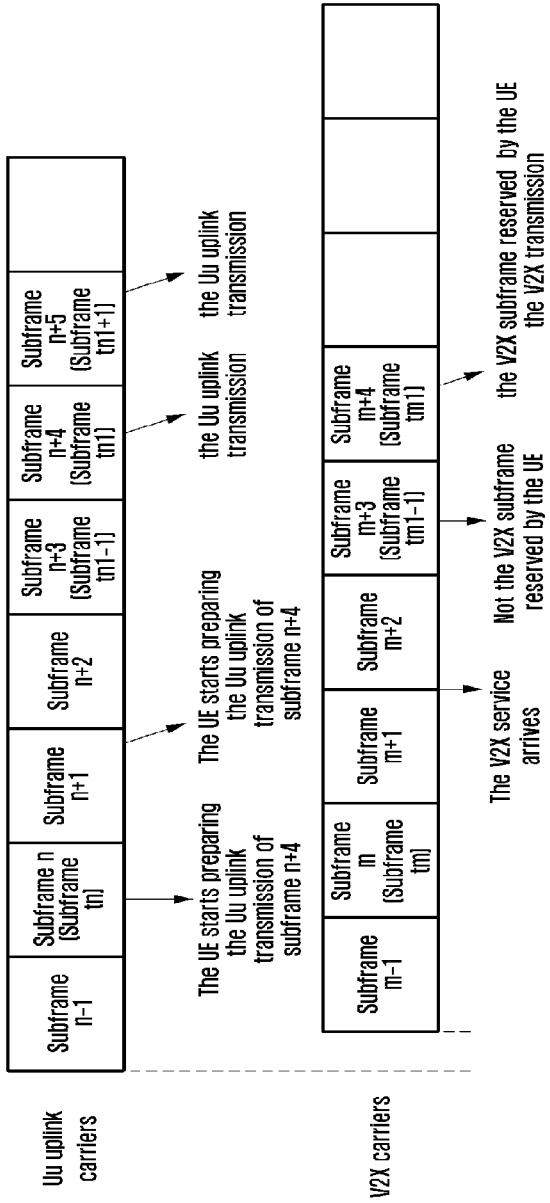

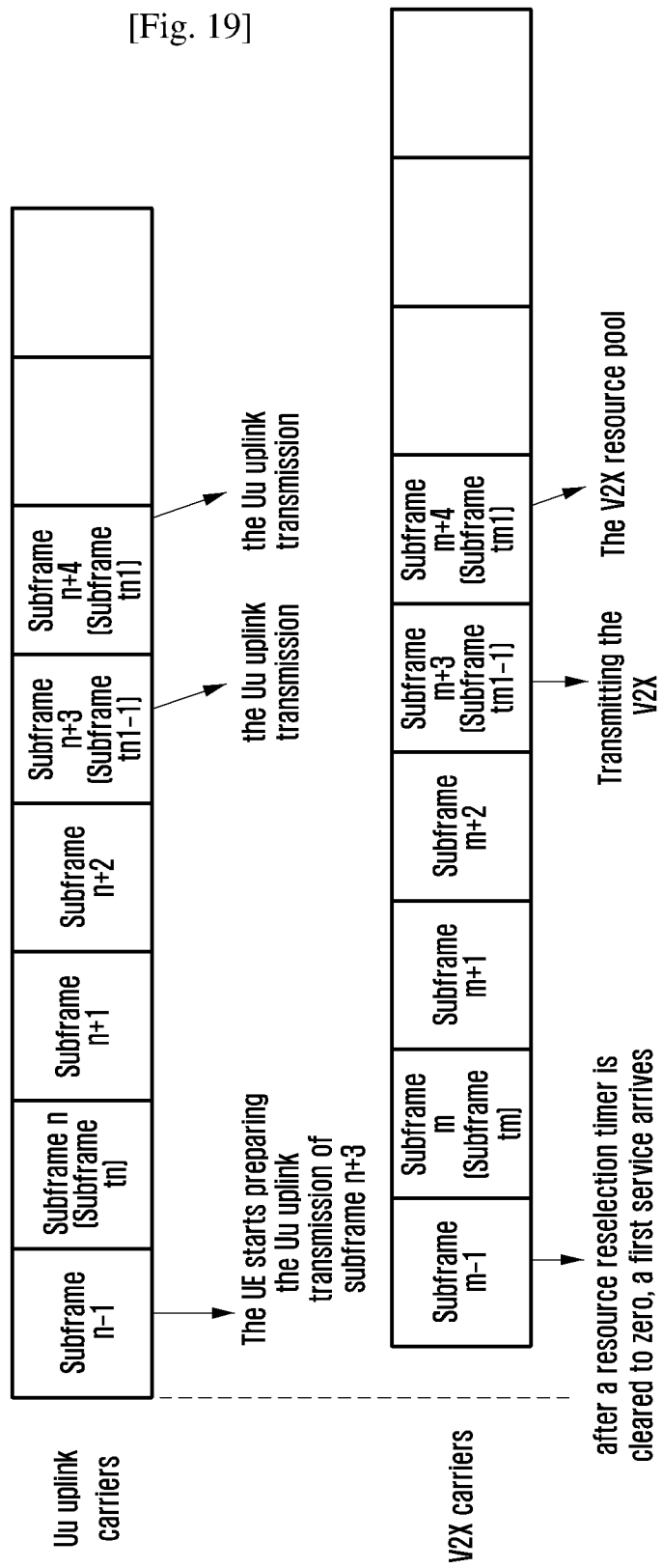
[Fig. 19]

[Fig. 20]
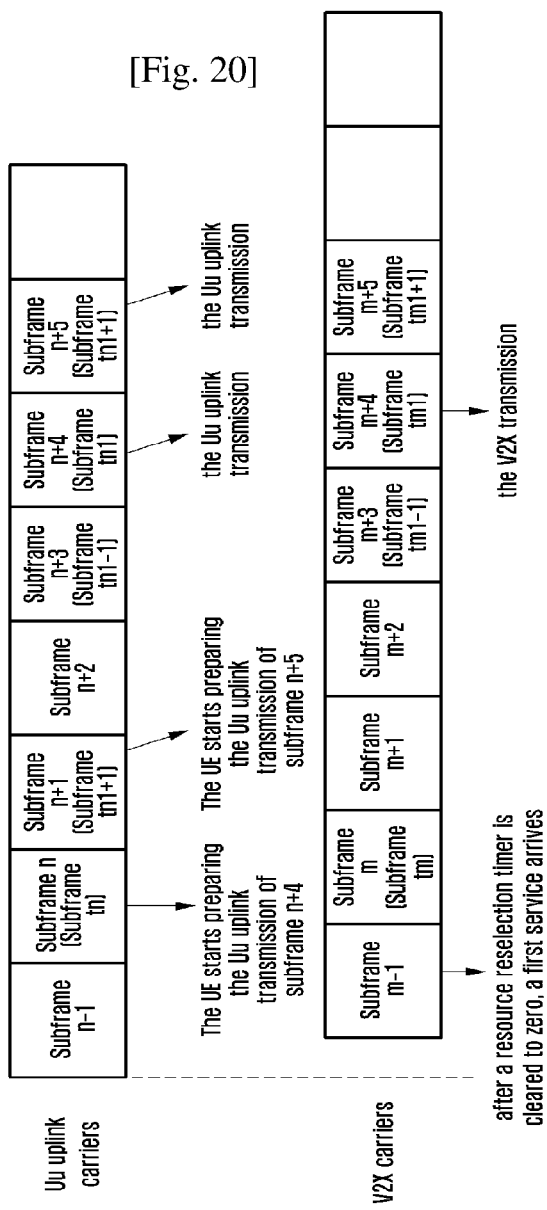
[Fig. 21]
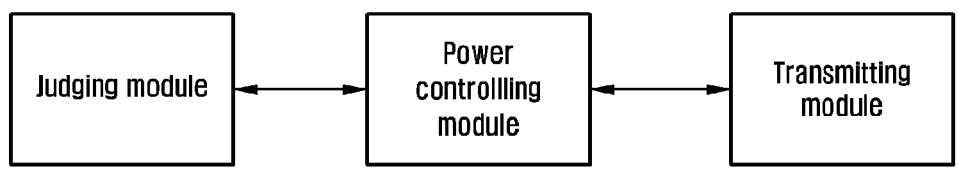

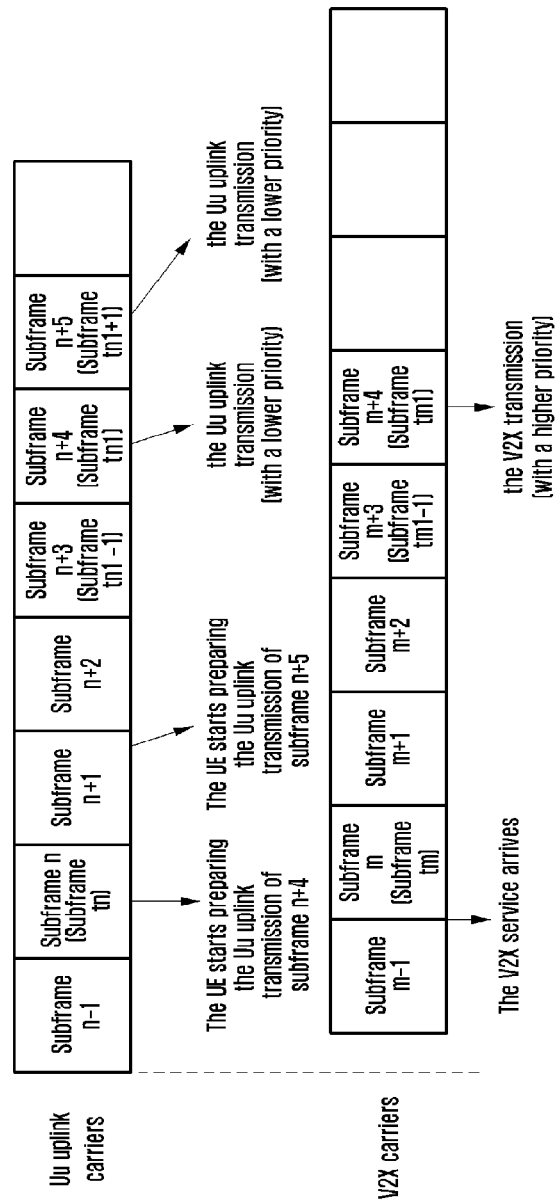
[Fig. 22]

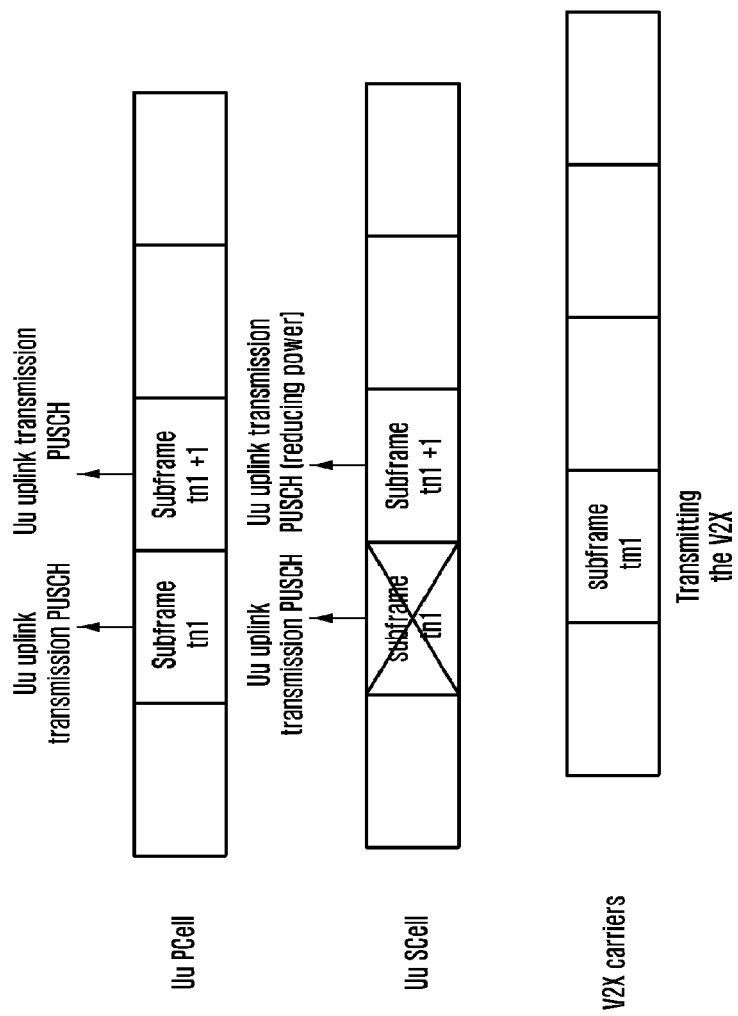
[Fig. 23]

POWER CONTROL FOR OVERLAPPING SIDELINK AND UPLINK TRANSMISSIONS

PRIORITY

This application is a National Phase Entry of PCT International Application No. PCT/KR2017/011058 which was filed on Sep. 29, 2017, and claims priority to Chinese Patent Application Nos. 201610875507.0, 201610884698.7, 201610889199.7, and 201610957775.7, which were filed on Sep. 30, 2016, Oct. 10, 2016, Oct. 11, 2016, and Oct. 27, 2016, respectively, the content of each of which is incorporated herein by reference.

TECHNICAL FIELD

The present application relates to wireless communication technologies, in particular to a method and a device for determining the transmission power in V2X systems.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Standardization of Device to Device (D2D) communications has been realized in 3GPP due to its huge potential benefits in the public security field and the common civil communication field. In 3GPP standards, a direct communication link between two devices may be named as a sideline. Similarly to uplink and downlink, there are also control channels and data channels on the sideline. The control channels on the sideline may be named as Physical Sidelink Control Channel (PSCCH), and the data channels on the sideline may be named as Physical Sidelink Shared CHannel (PSSCH). The PSCCH is to indicate the location of time-frequency domain resources of a PSSCH transmission, a modulation and coding scheme and a receiving target ID corresponding to the PSSCH, and etc. And the PSSCH is to carry data.

Since the D2D communication specified in the 3GPP standards is mainly focused on terminals with low speeds and services that is not sensitive to time delay and of low reliability requirements, the D2D functions that have been already implemented are far from meeting the users' requirements. Based on an existing D2D broadcasting communication architecture, standardization of some of the functions of communications with a low time delay and a high reliability between high speed devices, between a high speed device and a low speed device and between a high speed device and a static device has been further realized in 3GPP. That is, vehicle to vehicle/pedestrian/infrastructure/network (V2X) communications have been further realized in 3GPP. Therefore, the sideline communication includes two patterns in the existing 3GPP, i.e., D2D and V2X.

DISCLOSURE OF INVENTION

Technical Problem

A user equipment in V2X communications (hereinafter referred to as UE) may support an LTE cellular network transmission, which is called as a transmission based on Uu. And the UE may also support a V2X transmission. In some examples, the UE may support transmissions of several uplink carriers at the same time, wherein at least one carrier is used for the Uu uplink transmission, and at least one carrier is used for the V2X transmission. Besides, a base station may schedule the V2X transmission in a way of cross-carrier through downlink carriers of the LTE cellular network.

Then, an urgent problem to be solved is how to assign the transmission power of each carrier by the UE when the UE performs transmission on several carriers. Especially, when there is a circumstance that the transmission power of the UE is limited, how does the UE adjust the transmission power of each carrier?

Solution to Problem

To realize the above objects, the present application adopts the following technical solutions:

A method of power control includes:

determining, by a user equipment (UE), a Uu uplink transmission subframe and/or a V2X transmission subframe;

assigning, by the UE, a transmission power according to the circumstance that whether there is a Uu uplink transmission and/or a V2X transmission in a subframe;

performing, by the UE, the Uu uplink transmission and/or the V2X transmission in the subframe based on the transmission power assigned.

In some examples, the step of assigning, by the UE, a transmission power according to the circumstance that whether there is a Uu uplink transmission and/or a V2X transmission in a subframe includes: assigning, the transmission power according to the circumstance that there is only one of the Uu uplink transmission and the V2X transmission in the subframe, or the circumstance that there are both the Uu uplink transmission and the V2X transmission in the subframe at the same time.

In some examples, the step of assigning, by the UE, a transmission power according to the circumstance that whether there is a Uu uplink transmission and/or a V2X transmission in a subframe includes: assigning, the transmission power according to the circumstance that there is only one of the Uu uplink transmission and the V2X transmission in the subframe, or the circumstance that there are both the Uu uplink transmission and the V2X transmission in the subframe at the same time, or the circumstance that there are potentially both the Uu uplink transmission and the V2X transmission in the subframe at the same time.

In some examples, the step of assigning the transmission power according to the circumstance that there are both the Uu uplink transmission and the V2X transmission in the subframe at the same time includes:

assigning, the transmission power for the Uu uplink transmission and the V2X transmission based on the power required when the transmission power of the UE is not limited; and assigning, the transmission power for the Uu uplink transmission and the V2X transmission in accordance with a priority policy when the transmission power of the UE is limited.

In some examples, the priority policy includes: the priority of the Uu uplink transmission is higher than that of the V2X transmission; or, the priority of a V2X channel of a first type of V2X service is higher than or equal to that of the Uu uplink channel, and the priority of a V2X channel of a second type of V2X service is lower than or equal to that of the Uu uplink channel; or, the priority of a physical sidelink control channel (PSCCH) and the priority of a physical sidelink share channel (PSSCH) of the V2X transmission are the same; or the priority of the PSCCH is higher than that of the PSSCH.

In some examples, assigning, the transmission power according to the circumstance that there is only one of the Uu uplink transmission and the V2X transmission in the subframe, or the circumstance that there are both the Uu uplink transmission and the V2X transmission in the subframe at the same time when an actual time delay from the arriving of a V2X service to the transmitting of the V2X transmission by the UE is larger than a minimum time delay required by the UE for preparing Uu uplink transmission power in Uu communication.

In some examples, assigning the transmission power according to the circumstance that there are potentially both the Uu uplink transmission and the V2X transmission in the subframe at the same time includes: when the transmission power of the UE is limited, in accordance with a priority policy, assigning the transmission power with a higher priority at first and adjusting the transmission power with a lower priority, so that the sum of the power of the Uu uplink transmission and the V2X transmission does not exceed a maximum transmission power.

In some examples, adjusting the transmission power with a lower priority includes:

dropping transmitting the transmission with a lower priority, or, reducing the power of a part of the subframe of the transmission with a lower priority, or, reducing the power of the entire subframe of the transmission with a lower priority.

In some examples, assigning the transmission power according to the circumstance that there are potentially both the Uu uplink transmission and the V2X transmission in the subframe at the same time includes: for a Uu uplink subframe overlapping with at least one subframe in a V2X resource pool, reserving, by the UE, power Pg for the V2X transmission and assigning the transmission power for the Uu uplink transmission and the V2X transmission.

In some examples, assigning the transmission power according to the circumstance that there are potentially both the Uu uplink transmission and the V2X transmission at the same time includes: for a Uu uplink subframe overlapping with at least one subframe of a V2X gap, reserving, by the UE, power Pg for the V2X transmission and assigning the transmission power for the Uu uplink transmission and the V2X transmission.

In some examples, assigning the transmission power according to the circumstance that there are potentially both the Uu uplink transmission and the V2X transmission at the same time includes: for a Uu subframe overlapping with a V2X transmission subframe reserved by the UE, reserving, by the UE, power Pg for the V2X transmission and assigning the transmission power for the Uu uplink transmission and the V2X transmission; or, for the Uu subframe overlapping with the V2X transmission subframe reserved by the UE, assigning the transmission power for the Uu uplink transmission and the V2X transmission according to a predefined priority.

In some examples, when the UE performs a resource reselection, the UE removes from a selection window a subframe that causes the transmission power of the V2X transmission below a predetermined threshold; or, after a resource reselection timer is cleared to zero, and before a first V2X service arrives, for the Uu subframe overlapping with at least one subframe in a V2X resource pool, reserving, by the UE, power Pg for the V2X transmission and assigning the power for the Uu uplink transmission and the V2X transmission.

In some examples, the step of assigning the transmission power according to the circumstance that there are potentially both the Uu uplink transmission and the V2X transmission at the same time includes: when the power required by the transmission with a higher priority exceeds the power reserved, assigning the power required by the transmission with a higher priority, and reducing the power required by the transmission with a lower priority or dropping the transmission with a lower priority.

In some examples, the step of assigning the transmission power according to the circumstance that there are potentially both the Uu uplink transmission and the V2X transmission at the same time includes: when the power required by the transmission with a higher priority exceeds the power reserved, if the priority of the V2X transmission is higher, dropping transmitting at least one Uu uplink transmission carrier, wherein, a Uu uplink transmission carrier with a relatively lower priority is to be dropped first. The priority of PRACH is higher than that of PUCCH, is higher than that of PUSCH with UCI, and is higher than that of PUSCH.

In some examples, a V2X carrier is synchronized with a Uu uplink carrier, and a minimum time delay from the arriving of a V2X service to the transmitting of the V2X transmission on the selected resource by the UE in V2X communication equals to a minimum time delay required by the UE for preparing the Uu uplink transmission.

In some examples, a base station transmits a scheduling signaling to schedule PSCCH and PSSCH resource of V2X communications.

In some examples, a V2X carrier is not synchronized with a Uu uplink carrier, and a minimum time delay from the arriving of a V2X service to the transmitting of the V2X transmission on the selected resource by the UE in V2X communication equals to a minimum time delay required by the UE for preparing the Uu uplink transmission.

In some examples, a minimum time delay from the arriving of a V2X service to the transmitting of the V2X transmission on the selected resource in V2X communication is smaller than a minimum time delay required by the UE preparing the Uu uplink transmission power.

A device of power control includes:

a judging module, to judge whether there is a V2X transmission in a Uu uplink transmission subframe, and/or whether there is a Uu uplink transmission in a V2X transmission subframe;

a power controlling module, to control the power of the Uu uplink transmission and/or the V2X transmission based on predefined criteria and results of the judging module;

a transmitting module, to perform the Uu uplink channel transmission and/or the V2X transmission based on the power determined by the power controlling module.

Advantageous Effects of Invention

The present disclosure provides a method and a device of power control, for a Uu uplink transmission and a V2X transmission. Specifically, the present disclosure provides a method for determining the transmission power based on the circumstance of synchronous/asynchronous carriers, a minimum time delay of preparing the transmission power of the V2X and Uu uplink transmission, and an actual time delay of V2X from a resource reselection to a transmission. By this method, the transmission efficiency of the V2X and the Uu uplink transmission can be ensured.

BRIEF DESCRIPTION OF DRAWINGS

FIG. 1 is a schematic diagram illustrating a V2X subframe reserved by a UE in a V2X.

FIG. 2 is a flowchart illustrating a first example of the present application;

FIG. 3 is a flowchart illustrating a second example of the present application;

FIG. 4 is a flowchart illustrating a third example of the present application;

FIG. 5 is a schematic diagram illustrating a V2X carrier not synchronizing with a Uu uplink carrier in accordance with an example of the present application;

FIG. 6 is a schematic diagram illustrating a V2X carrier not synchronizing with a Uu uplink carrier in accordance with another example of the present application;

FIG. 7 is a schematic diagram illustrating a V2X carrier synchronizing with a Uu uplink carrier in accordance with an example of the present application;

FIG. 8 is a first schematic diagram illustrating the second example of the present application;

FIG. 9 is a second schematic diagram illustrating the second example of the present application;

FIG. 10 is a third schematic diagram illustrating the second example of the present application;

FIG. 11 is a forth schematic diagram illustrating the second example of the present application;

FIG. 12 is a first schematic diagram illustrating the third example of the present application;

FIG. 13 is a second schematic diagram illustrating the third example of the present application;

FIG. 14 is a third schematic diagram illustrating the third example of the present application;

FIG. 15 is a forth schematic diagram illustrating the third example of the present application;

FIG. 16 is a fifth schematic diagram illustrating the third example of the present application;

FIG. 17 is a sixth schematic diagram illustrating the third example of the present application;

FIG. 18 is a seventh schematic diagram illustrating the third example of the present application;

FIG. 19 is an eighth schematic diagram illustrating the third example of the present application;

FIG. 20 is a fifth schematic diagram illustrating the second example of the present application;

FIG. 21 is a schematic diagram illustrating a device in accordance with an example of the present application;

FIG. 22 is a sixth schematic diagram illustrating the second example of the present application;

FIG. 23 is a schematic diagram illustrating a fourth example of the present application.

MODE FOR THE INVENTION

In order to make the object, technical solution and merits of the present application clearer, the present application is further illustrated in detail hereinafter with reference to the accompanying drawings and detailed examples.

V2X communications may be divided into two modes. One is a transmission mode controlled by a UE, which is named as mode 4. Resources of a physical sidelink control channel PSCCH and a physical sidelink shared channel PSSCH transmitted by the UE is decided by the UE. Assuming that a data transmission mechanism of the UE may includes the following. At first the UE transmits the control channel, wherein the control channel is to indicate a time-frequency resource for the data channel and modulation and coding scheme (MCS), etc., which is named as Scheduling Assignment (SA) hereinafter. Then, the UE performs data transmission on the scheduled data channel. For an LTE D2D/V2X system, the SA is also named as PSCCH, the data channel is also named as PSSCH. Since the V2X communication service has the characteristics of approximately periodicity, a semi-persistent resource occupancy mechanism is introduced in an existing standardization of a V2X system. According to a current conclusion of 3GPP, when performing resource selection in subframe n, a V2X UE predicts an idle resource after the subframe n according to a channel detection result in [n−a, n−b], wherein a−b is no less than 1 s, so as to obtain enough absolute resource occupancy information. When selecting an idle frequency resource in subframe n+d for transmission of this data packet, the UE may further reserve a same frequency resource in subframe n+e for transmission of a data packet generated later, wherein e=d+j*P, j=i, 2i, . . . , J*i. i*P expresses a resource occupancy period, P expresses a minimum resource occupancy period, e.g., P=100 ms, and J expresses the maximum number of times of resource reservation. As shown in FIG. 1. Besides, the UE may indicate a subframe of a next TB transmission through the PSCCH. The subframe is one of the previously described n+e subframes. And each TB may be retransmitted K times, wherein, K may be larger than or equal to 1. Accordingly, K resources are selected based on the above method. And each resource reserves J periods, so as to avoid being unable to receive the data for part of the equipment because of the limitation of the semi-duplex operation.

The other transmission mode of the V2X communication is a transmission mode controlled by a base station, which is named as mode 3. The base station transmits a scheduling signaling to schedule PSCCH and PSSCH resources of the V2X communication. Assuming the minimum time delay from the scheduling signaling to the transmitting of PSCCH/PSSCH by the V2X UE is $X_0$ ms, e.g., $X_0$=4. In mode 3, there are a transmission mode based on a Semi-Persistent Scheduling (SPS) and a transmission mode based on dynamical scheduling of the base station. In the transmission mode based on the SPS, the UE determines the PSCCH and PSSCH resources according to the scheduling signaling transmitted by the base station. Besides, similarly to mode 4, the UE may transmit PSSCH by occupying resource periodically. In the transmission mode based on the dynamical scheduling of the base station, the PSCCH and PSSCH resources are determined according to the scheduling signaling transmitted by the base station among each transmission of the V2X communication of the UE.

In mode 4, when the UE performs a resource reselection, from resource reselection to transmitting PSCCH/PSSCH on the selected resource, the minimum time delay $X_1$ is not larger than 4 ms. The minimum time delay may be reduced according to the capability of the UE, for example $X_1$=1, 2 or 3. The UE adjusts the minimum time delay $Y_1$ of adjusting the PSCCH/PSSCH transmission power in V2X communication, and $Y_1$ is smaller than or equal to $X_1$. Similarly, there is a minimum time delay from the arriving of a V2X service to the transmitting of the PSCCH/PSSCH on the selected resource in the PSCCH/PSSCH after finishing transmitting PSCCH/PSSCH of a first TB after resource reselection, it may be considered that the time delay is smaller than or equal to $X_1$. In the present application, for facilitating the description, hereinafter, the time delay of the two cases is collectively referred to as the minimum delay $X_1$ from the arriving of the V2X service to the transmitting of the PSCCH/PSSCH on the selected resource.

Comparing to LTE cellular transmissions, the minimum time delay from the UE receiving an uplink scheduling signaling (UL grant) to the UE transmitting an uplink transmission PUSCH scheduled $X_2$ equals to 4 subframes (for example, in subframe n the UE receives the UL grant, and in subframe n+4 the UE transmits PUSCH. Taking into account TA ahead of time of uplink, the absolute time delay is usually smaller than 4 ms. For facilitating the description, hereinafter, the descriptions usually do not distinguish the absolute time delay and the relative time delay, except for some special cases). In general, we assume that the minimum time delay required by the UE preparing the uplink transmission PUSCH is $X_3$. $X_3$ is usually smaller than or equal to $X_2$. If the process of adjusting the power and bit preparation are processed by the UE simultaneously, then it is considered that the minimum delay of adjusting the power $Y_3$=$X_3$. If the process of adjusting the power and the bit preparation are processed by the UE separately, then it is considered that the minimum delay of adjusting the power $Y_3$ is usually smaller than $X_3$, for example $Y_3$ may be smaller than 4 ms, which is related to the specific implementation of the UE. In the present application, the two cases are both within the scope of discussion. It's not hard to see, when the UE transmits a Uu uplink transmission and also transmits a V2X transmission in the same uplink subframe, for example in subframe n+4, the subframe where the UL grant scheduling the Uu uplink transmission is located may be earlier than the time that the V2X data packet arrives (i.e., the time of resource reselection). For example, the UE receives the UL grant scheduling the Uu uplink transmission in subframe n, and the UL grant schedules the Uu uplink transmission in subframe n+4, uplink carrier $C_1$, and the UE determines that the V2X data packet arrives in subframe n+2, after resource reselection, the UE transmits PSSCH and/or PSCCH in subframe n+4, uplink carrier $C_2$. Assuming that the minimum delay of adjusting the power of the Uu uplink transmission $Y_3$=3, i.e., the UE receives the UL grant in subframe n, and starts preparing for the Uu uplink transmission (including adjusting power) on the uplink carrier $C_1$ from subframe n+1, but the UE determines in subframe n+2 to perform the V2X transmission on the uplink carrier $C_2$ which also includes subframe n+4. Therefore, there's no time for the UE to adjust the Uu uplink transmission power after subframe n+2. The present application provides a concrete solution to the problem.

Besides, even the minimum time delay $X_1$ from the arriving of the V2X service to the transmitting of the PSCCH/PSSCH on the selected resource is not smaller than the minimum delay $X_3$ required by the UE for preparing the Uu uplink transmission PUSCH, since an uplink timing of an uplink carrier of the Uu uplink transmission and a timing of an carrier where the V2X transmission is located may be different, it may also lead to that an absolute time of the subframe where the UL grant scheduling the Uu uplink transmission is located may be earlier than the arriving of the V2X data packet when the UE transmits the Uu uplink transmission and the V2X transmission in the same uplink subframe. For example, the uplink timing of the Uu uplink transmission is determined based on a timing of downlink transmission of the base station, and the timing of the V2X transmission is determined based on GNSS. There may be an obvious deviation between these two timings; for example, the deviation is larger than a maximum time difference of each carrier in carrier aggregation, i.e., 33 us. Therefore, it may appear that the UE has already started adjusting the Uu uplink transmission power, when V2X is determined to be transmitted in the same uplink subframe, there's no time for the UE to adjust the Uu uplink transmission power according to the V2X transmission. The present application also provides a concrete solution to the problem.

Except that there's no time for the UE to adjust the Uu uplink transmission power according to the V2X transmission, there is a possibility that there is enough time for the UE to adjust the Uu uplink transmission power according to the V2X transmission. For the two cases, the present application provides specific solutions for determining the Uu uplink transmission power, and the V2X transmission power.

When the time difference between the timings of the V2X carrier and the Uu uplink carrier is larger than a predetermined threshold $T_{threshold}$, it is assumed that subframe $t_n$ of the Uu uplink carrier is not synchronized with subframe $t_n$ of the V2X uplink carrier. As shown in FIG. 5. Therefore, it may appear that a subframe of a carrier, for example, subframe $t_{n1}$ of the Uu uplink carrier, overlaps in time with two subframes of another carrier at the same time, for example, subframe $t_{m1}$ and $t_{m1}-1$ of the V2X carrier. In some examples, wherein $T_{threshold}$ may refer to $T_{del\_threshold}$ of Dual connectivity in the existing LTE system (TS 36.213 5.1.4), such as be about 33 us.

When the time difference between the timings of the V2X carrier and the Uu uplink carrier is smaller than a predetermined threshold, it is assumed that the two carriers are synchronized.

The present application also provides concrete solutions for the two synchronization situations.

When performing a resource reselection in subframe n, the UE selects resource in a selection window [n+$T_1$, n+$T_2$]. $T_1$ and $T_2$ relies on the implementation of the UE, such as $T_1 \le 4$, $20 \le T_2 \le 100$. $T_1$ relies on the impact of the processing time delay (the previously described $X_1$) from selecting resource to starting transmitting SA and data, and $T_2$ mainly relies on time delay characteristics endured by the current service. As such, the actual time delay from the arriving of the V2X service (i.e., the time of performing resource reselection) to the transmitting of the PSCCH/PSSCH by the UE may be larger than the minimum time delay from the service arriving to the UE transmitting PSCCH/PSSCH. For example, the actual time delay from resource reselection to transmitting PSCCH/PSSCH on the selected resource is 5 ms, but the minimum time delay T1=$X_1$=4 ms. For another example, in the case of periodically reserving resources, the actual time delay from the service arriving to transmitting PSCCH/PSSCH on the reserved resources may be larger than the minimum time delay. When the actual time delay is larger than the minimum time delay required by preparing uplink transmission PUSCH power in Uu communication, the UE is capable of determining that whether there is only the V2X or the Uu uplink transmission, or there are both the V2X and the Uu uplink transmission in the same subframe (synchronization) or in other subframes overlapping with the same subframe (non synchronization).

As shown in FIG. 6, assuming that the minimum time delay of V2X and the minimum time delay of the uplink transmission power preparation are the same, and both equal to 4. Subframe $t_{n1}$ is the subframe of the UE transmitting Uu uplink data scheduled. Taking the case of non synchronization for example, subframe $t_n$ of the Uu uplink carrier overlaps with subframe tm−1 and subframe tm of the V2X carrier. Subframe $t_n$ is a time point of the UE starting preparing the power of the Uu uplink data scheduled after receiving the UL grant of scheduling the Uu uplink data. Subframe $t_n$ is before subframe $t_{n1}$, and a time difference $X_5$ is larger than or equal to the minimum time delay $Y_3$ of adjusting power. Assuming that the V2X service arrives in subframe tm−1, and the UE chooses to transmit the V2X in subframe $t_{m1}+1$, i.e., after 6 subframes. Then, for subframe $t_{n1}-1$, the UE may not determine that whether there is V2X transmission in subframe $t_{m1}-1$, but for subframe $t_{n1}$ and subframe $t_{n1}+1$, the UE may determine that there is no V2X transmission in subframe $t_{m1}$, and there is the V2X transmission in subframe $t_{m1}+1$. Therefore, for the Uu uplink transmission power of subframe $t_{n1}$ and subframe $t_{n1}+1$, and the V2X uplink transmission power of subframe $t_{m1}+1$, the V2X and the Uu uplink transmission power may be both determined based on the channel priority. The specific may be seen in a first example below.

Besides, similarly, before the UE starts preparing the Uu uplink transmission power in subframe $t_n$, if the V2X service has arrived, the UE is also capable of determining that whether there is a V2X transmission in subframe $t_{n1}$ (synchronization) or in subframe $t_{m1}$ and subframe $t_{m1}-1$ (non synchronization) of the V2X carrier overlapping with subframe $t_{n1}$. Then assigning power may be performed based on the channel priority for the V2X and the Uu uplink transmission according to the method of the first example.

For facilitating the description, hereinafter, the Uu uplink transmission in the present application is mainly described by taking PUSCH as an example, but not limited to PUSCH. It also applies to PUCCH/SRS/PRACH. For example, there is also a minimum delay problem of preparing transmission power similar to PUSCH for PUCCH in subframe n+4 of ACK/NACK of downlink PDSCH of subframe n. Similarly, aperiodic SRS has similar problems. For a periodic SRS, it may be considered that when the UE prepares the V2X transmission, if overlapping with the periodic SRS, it is considered that there must be a Uu uplink transmission. The specific process may be seen in the first example. For another example, for the PUSCH of the Uu based on SPS, it may be considered that when the UE prepares the V2X transmission, if overlapping with the SRS, it is considered that there must be a Uu uplink transmission. The specific process may be seen in the first example.

For facilitating the description, hereinafter, the V2X transmission in the present application is mainly described by taking PSSCH/PSCCH as an example, but not limited to PSSCH/PSCCH. The present application also applies to sidelink synchronous signal SLSS (PSS/SSS) and physical sidelink broadcast channel (PSBCH).

A First Example

FIG. 2 is a flowchart of the present application.

In block 201, in subframe $t_n$, the UE judges whether there is a Uu uplink transmission and/or a V2X transmission in subframe $t_{n1}$. If there is only the Uu uplink transmission or the V2X transmission, proceed to block 202-1. If there are both the Uu uplink transmission and the V2X transmission, proceed to block 202-2. If there is none of them, the UE does not need to perform any operation.

Wherein, subframe $t_{n1}$ is the subframe where the UE transmits the Uu uplink data or the V2X transmission. Subframe $t_n$ is a time point of the UE starting preparing the power of the Uu uplink data scheduled or a time point of the UE starting preparing the V2X transmission power. Subframe $t_n$ is before subframe $t_{n1}$, and a time difference $X_5$ is larger than or equal to the minimum time delay $Y_1$ or $Y_3$ of adjusting power.

In some examples, the carrier used for the V2X transmission and the carrier used for the Uu uplink transmission are different carriers.

For example, when the V2X carrier is synchronized with the Uu uplink carrier, and when the minimum time delay $X_1$ from the arriving of the V2X service to the transmitting of the PSCCH/PSSCH on the selected resource in V2X communication equals to the minimum delay $X_3$ required by the UE preparing the uplink transmission PUSCH in Uu communication (further, in specific implementations, it may be that the minimum time delay $Y_1$ of the UE adjusting the PSCCH/PSSCH transmission power in V2X communication equals to the minimum time delay $Y_3$ required by the UE for preparing the uplink transmission PUSCH power in Uu communication), the UE may accurately determine whether there is the Uu uplink transmission and/or the V2X transmission in subframe $t_{n1}$. For another example, when the minimum time delay $Y_1$ is smaller than the minimum time delay $Y_3$, but the actual time delay from the arriving of the V2X service to the transmitting of the PSCCH/PSSCH by the UE is larger than the minimum delay required by the UE preparing the uplink transmission PUSCH power in Uu communication, the UE may also accurately determine whether there is the Uu uplink transmission and/or the V2X transmission in subframe $t_{n1}$.

When the time difference between the V2X service carrier and the Uu uplink carrier is smaller than a predetermined threshold $T_{threshold}$, it may be considered that subframe $t_n$ of the Uu uplink carrier is synchronized with subframe $t_n$ of the V2X uplink carrier, as shown in FIG. 7. In some examples, wherein $T_{threshold}$ may refer to $T_{del\_threshold}$ of Dual Connectivity in the existing LTE system (TS 36.213 5.1.4), such as be about 33 us, or $T_{threshold}$ may be preset according to the minimum time difference of the uplink carrier defined by carrier aggregation in the existing standards.

In some examples, depending on the transmission modes, it may also determine whether it is certain or not to perform the V2X transmission in subframe $t_{n1}$ by the UE receiving signaling transmitted by the base station scheduling V2X in subframe $t_{n1}$. In some examples, the criterion applies to the V2X transmission scheduled by the scheduling signaling from the base station. For example, the criterion applies to the V2X transmission mode 3. Further, the criterion applies to the transmission mode based on dynamical scheduling signalings from the base station of the V2X transmission mode 3, or a first transmission of the transmission mode based on the SPS scheduling (the transmission triggered by SPS activation signaling).

If the UE receives the scheduling signaling indicating that the V2X transmission is performed in the subframe overlapping with subframe $t_{n1}$ (when synchronized, i.e., subframe $t_{n1}$, when not synchronized, i.e., subframe $t_{m1}$ and subframe $t_{m1}-1$ overlapping with subframe $t_{n1}$, for facilitating the description, hereinafter, it is described as subframe $t_{n1}$), the UE determines to perform the V2X transmission in subframe $t_{n1}$.

If the UE receives the scheduling signaling indicating that the V2X transmission is performed in subframe $t_{n2}$ ($t_{n1} \neq t_{n2}$), or the UE does not receive the scheduling signaling, the UE may determine that there is no V2X transmission based on the base station scheduling signaling (including each V2X transmission of the transmission mode based on the dynamical scheduling signaling from the base station of the V2X transmission mode 3, or a first transmission of the transmission mode based on the SPS scheduling) in subframe $t_{n1}$. Because in the V2X transmission mode 3, the minimum time delay from the scheduling signaling to the transmitting of the PSCCH/PSSCH of the UE $X_0=4$ ms, equals to the minimum time delay from the Uu uplink transmission receiving the UL grant to the uplink transmission $X_2$ ($X_2=4$ ms). Therefore, if the UE does not receive the scheduling signaling that schedules the subframe $t_{n1}$ in subframe $t_{n1}$, the UE is certain not to transmit V2X in subframe $t_{n1}$.

In block 202-1, if there is only the Uu uplink transmission, the UE performs a power assignment according to an existing priority criterion. If there is only the V2X transmission, the UE performs a power assignment for the V2X transmission according to an existing power control.

Specific implementations in this block may be referred to the prior art.

In block 202-2, the UE performs a power assignment for the Uu uplink transmission and the V2X transmission according to a predefined priority criterion.

In some examples, the predefined priority criterion is one or more of the following criteria:

(1) When the transmission power of the UE is not limited, i.e., a sum of the transmission power of all the carriers does not exceed the maximum transmission power of the UE, the UE does not need to reduce the power. The UE performs transmission according to the expected power. For example, the Uu uplink transmission power is determined according to the power control formula in TS 36.213 5.1, the V2X transmission power is determined according to the power control formula in TS 36.213 14.1.1.5.

(2) When the transmission power of the UE is limited, it is determined according to one or more of the following ways:

(2.1) The priority of the Uu uplink transmission power is higher than that of V2X.

When there are several uplink carriers carrying the Uu uplink transmissions, the priorities of the carriers are determined according to the existing priority criterion. For example, PUCCH of Uu>PUSCH of Uu with UCI>PUSCH of Uu without UCI>PSCCH/PSSCH/SLSS/PSBCH of V2X.

(2.2) The priority of a first type of V2X service is higher than or equal to that of the Uu uplink transmission, and the priority of a second type of V2X service is lower than or equal to that of the Uu uplink transmission.

In V2X communications, the V2X data transmitted by the UE have different priorities. The physical layer of the UE obtains the priority of the scheduled TB through the scheduling grant provided by a higher layer. There are 8 kinds of priorities. We may define one or more V2X services which have the highest priority as a first type of V2X service, such as Decentralized Environmental Notification Message (DENM), the other V2X services are second type of V2X services. The priority of the second type of V2X service is lower than or equal to that of the Uu uplink transmission.

Moreover, in V2X communications, the priorities may also be different for different V2X channels. In some examples, the priority of SLSS/PSBCH is higher than that of PSSCH/PSCCH. For example, SLSS/PSBCH belongs to the first type of priority, and PSSCH/PSCCH belongs to the second type of priority. Then, when the UE transmits SLSS/PSBCH on the V2X carrier, and transmits the Uu uplink transmission on at least one of the Uu uplink carriers at the same time, the priority of SLSS/PSBCH is higher than that of the Uu uplink transmission. For another example, SLSS/PSBCH and some of the PSSCH/PSCCH V2X services both belong to the first type of V2X service, for example, SLSS/PSBCH and PSSCH/PSCCH carrying a DENM service belong to the first type of V2X service, and PSSCH/PSCCHs of the other 7 kinds of services belong to the second type of V2X service.

In some examples, SLSS/PSBCH belongs to the second type of priority, and the V2X service of which PPPP is smaller than the PPPP threshold also belongs to the second type of priority, the V2X service of which PPPP is larger than the PPPP threshold belongs to the first type of priority. For example, when the UE transmits SLSS/PSBCH on the V2X carrier, and transmits the Uu uplink transmission on at least one of the Uu uplink carriers at the same time, the priority of SLSS/PSBCH is lower than that of the Uu uplink transmission. For another example, when the UE transmits PSSCH/PSCCH of which PPPP is larger than the PPPP threshold on the V2X carrier, and transmits the Uu uplink transmission on at least one of the Uu uplink carriers at the same time, the priority of PSSCH/PSCCH is higher than that of the Uu uplink transmission. For another example, when the UE transmits PSSCH/PSCCH of which PPPP is larger than the PPPP threshold on a V2X carrier, transmits the SLSS/PSBCH on anther V2X carrier, and transmits the Uu uplink transmission on at least one of the Uu uplink carriers at the same time, the priority of PSSCH/PSCCH is higher than that of the Uu uplink transmission, and the priority of the Uu uplink transmission is higher than that of SLSS/PSBCH. In some examples, when the UE transmits PSSCH/PSCCH on a V2X carrier, and transmits the SLSS/PSBCH on anther V2X carrier at the same time, the type of the PSSCH/PSCCH services are not distinguished, the priority of PSSCH/PSCCH is higher than that of SLSS/PSBCH, or the priority of PSSCH/PSCCH of which PPPP is larger than the PPPP threshold is higher than that of SLSS/PSBCH, otherwise, the priority of PSSCH/PSCCH is lower than or equal to that of the SLSS/PSBCH.

The priority of the first type of service is higher than or equals to that of the Uu uplink transmission, here are a few possibilities, but not limited to these possibilities. The priority of the second type of service is lower than or equal to that of the Uu uplink transmission, similarly, no longer lists.

(a) The priority of the first type of service is higher than that of all types of the Uu uplink transmissions, including PRACH, PUCCH, PUSCH with UCI, and PUSCH without UCI of Uu.

(b) The priority of the first type of service is higher than that of PUSCH without UCI of Uu, but is lower than that of PRACH, PUCCH and PUSCH with UCI of Uu.

(c) The priority of the first type of service is higher than that of PUSCH without UCI and PUSCH with UCI of Uu, but is lower than that of PRACH and PUCCH of Uu.

(d) The priority of the first type of service is higher than that of PUSCH without UCI, PUSCH with UCI and PUCCH of Uu, but is lower than that of PRACH of Uu.

For different priorities, according to the priorities, the power of the channel with higher priority is met at first, the rest of the power is assigned between the channels with the same priority, and the power of the channels with the same priority is reduced according to the same factor (the factor<1), so that the sum of the transmission power on all the carriers after the adjustment does not exceed the maximum transmission power of the UE. Or, for different priorities, the factors of different priorities may be different. For example, the factor of the highest priority is 1, the factor of second higher priority is s1, then s2, and so on, wherein 1>s1>s2, so that the sum of the transmission power on all the carriers after the adjustment does not exceed the maximum transmission power of the UE.

(2.3) The priority of PSCCH is the same as that of PSCCH in the V2X transmissions. Or, the priority of PSCCH is higher than that of PSSCH in the V2X transmissions.

In the description of (2.1) and (2.2), PSSCH and PSCCH are all referred to as the V2X transmission, which means that the priorities of PSSCH and PSCCH are the same. If the power is to be adjusted, the adjustment factors are the same. Considering that in some scenarios, PSCCH is used as a control signaling, it is reasonable to be assigned a higher priority. As a result, the power may be assigned based on (2.1) or (2.2), and the condition that the priority of PSCCH is bigger than that of PSSCH. For example, it may be PUCCH>PUSCH with UCI>PSCCH>PUSCH without UCI>PSSCH.

In block 203, the UE performs the Uu uplink transmission and/or the V2X transmission in subframe $t_{n1}$ based on the power determined in block 202.

A Second Example

FIG. 3 is a flowchart of the present application.

In block 301, in subframe $t_n$ or tm, the UE judges whether there is a Uu uplink transmission and/or a V2X transmission in subframe $t_{n1}$ or $t_{m1}$. If it is certain that there is only the Uu uplink transmission or the V2X transmission, proceed to block 302-1. If there are potentially both the Uu uplink transmission and the V2X transmission, proceed to block 302-2. If it is certain that there are both the Uu uplink transmission and the V2X transmission, proceed to block 302-3. The block 302-3 is carried out in accordance with the block 202-2 in the first example, or in accordance with the method described in this example. If there is none of them, the UE does not need to perform any operation.

Wherein, subframe $t_{n1}$ is the subframe where the UE transmits the Uu uplink data, and subframe $t_{m1}$ is the subframe where the UE transmits the V2X transmission. Subframe $t_n$ is a time point of the UE starting preparing the Uu uplink data power scheduled, and the subframe tm is a time point of the UE starting preparing the V2X transmission power. Subframe $t_n$ is before subframe $t_{n1}$, subframe tm is before subframe $t_{m1}$, and a time difference $X_5$ is larger than or equal to the minimum time delay $Y_1$ or $Y_3$ of power adjusting.

In the case of non synchronization, the subframes of different carriers may overlap in the time domain. For example, subframe $t_{n1}$ or subframe $t_{n1}+1$ may be the subframes performing the Uu uplink transmission, such as the uplink subframes configured by the base station in TDD system. Then compared to subframe $t_{m1}$, subframe $t_{n1}$ or subframe $t_{n1}+1$ is likely to be the subframe performing the Uu uplink transmission. If subframe $t_{m1}$ or subframe $t_{m1}-1$ is likely to be the subframe performing the V2X transmission, such as the subframe in the V2X resource pool, or the V2X subframe reserved by the UE, compared to subframe $t_{n1}$, it is likely to be the subframe performing the V2X uplink transmission. Note that when the uplink carriers of V2X and Uu are not synchronized, it may be that the time of V2X is before that of Uu, or the time of Uu is before that of V2X. For simplicity of description, the present application does not make a distinction between them, and the time of the Uu uplink transmission before that of V2X is taken as an example. The two cases are equivalent.

Only if it is certain that there is no V2X transmission in both the two V2X subframes overlapping with the Uu uplink subframe, it is regarded that there is only the Uu uplink transmission, and may proceed with block 302-1. In some examples, the circumstance that there is no V2X transmission may include at least two cases. One is that the two V2X subframes overlapping with the Uu uplink subframe are not the subframes in the V2X resource pool. The other is that the actual time delay from the V2X service arriving to transmitting PSCCH/PSSCH is larger than the minimum time delay of the Uu uplink transmission preparation power, and the UE has decided not to perform the V2X transmission in the subframe. If there may be the V2X transmission in at least one of the subframes overlapping with the Uu uplink subframe, and/or, the actual time delay from the arriving of the V2X service to the transmitting of V2X is smaller than or equal to the minimum time delay of the Uu uplink transmission preparation power, then it belongs to that there may be the V2X transmission, then proceed to block 302-2.

Only if it is certain that there is no Uu uplink transmission in both two Uu subframes overlapping with the V2X uplink subframe, for example, both of the two Uu subframes overlapping with the V2X uplink subframe are not the Uu uplink subframes, it is regarded that there is only the V2X transmission. And if at least one of the subframes overlapping with the V2X uplink subframe is the Uu uplink subframe, it belongs to that there may be a Uu transmission, then proceed to block 302-2.

In some examples, when the V2X carrier and the Uu uplink carrier are not synchronized, and in V2X communication, the minimum time delay from the arriving of the V2X service to the transmitting of PSCCH/PSSCH by the UE equals to the minimum time delay required by the UE for preparing uplink transmission PUSCH in Uu communications (further, in specific implementations, it may be that the minimum time delay $Y_1$ of adjusting the PSCCH/PSSCH transmission power in V2X communication equals to the minimum delay $Y_3$ required by the UE for preparing the uplink transmission PUSCH power in Uu communications), the UE may be unable to determine whether there is the Uu uplink transmission and/or the V2X transmission, proceed to block 302-2.

In some examples, when the actual time delay from the arriving of the V2X service to the transmitting of PSCCH/PSSCH by the UE is larger than the minimum delay required by the UE for preparing the uplink transmission PUSCH power in Uu communication, and the UE has decided to perform the V2X transmission in the subframe, then the UE may determines that there are both the uplink transmission and the V2X transmission in the subframe, then proceed to block 302-3.

In some examples, when the actual time delay from the arriving of the V2X service to the transmitting of PSCCH/PSSCH by the UE is larger than the minimum delay required by the UE for preparing the uplink transmission PUSCH power in Uu communications, the UE may proceed to block 302-2.

In some examples, the carrier used for the V2X transmission and the carrier used for the Uu uplink transmission are different carriers.

In block 302-1, if there is only the Uu uplink transmission, the UE performs the power assignment according to an existing priority criterion. If there is only the V2X transmission, the UE performs the power assignment according to an existing power control.

In block 302-2, if there are potentially both the Uu uplink transmission and the V2X transmission, when assigning power for the Uu uplink transmission, the power for the V2X transmission is required to be reserved, and when assigning power for the V2X transmission, the power for the Uu uplink transmission is required to be reserved.

The subframe that may include both the Uu uplink transmission and the V2X transmission is referred to as a first type of subframe. The definition of the first type of subframe and the power assigning method are as follows.

Wherein, the power reserved for the V2X transmission is Pg, and the power reserved for the Uu uplink transmission is Pu. In some examples, Pg and Pu are not absolute values, but rather ratios relative to the maximum transmission power Pcmax. For facilitating the description, in the examples of the present application, it is described as the absolute values. In some examples, Pu+Pg does not exceed 100%, Pu+Pg may be equal to 100% or smaller than 100%.

In some examples, Pu ranges from [p1,p2], for example, p1=0, p2=100%, Pg ranges from [p3,p4], for example, p3=0, p4=100%.

In some examples, the power reserved for the V2X transmission Pg is fixed to be 0, i.e., there is no power reserved for the V2X transmission. In this case, Pg may not be configured. For facilitating the description, the following is described according to the case that Pg is configured. However, the description may include the case that Pg is not configured.

In some examples, the power reserved for the V2X transmission Pg can not distinguish the type of the V2X services, i.e., only one Pg is configured for V2X transmissions.

In some examples, the power reserved for the V2X transmission Pg may be configured respectively according to the types of the V2X services. For example, there are 8 types of services in PPPP, 8 Pg may be configured respectively according to the 8 types of services. For another example, a Pg_high is configured for the service of which PPPP exceeds a predefined PPPP threshold, and a Pg_low is configured for the other services, i.e., there are two kinds of Pg configured. In a special case, Pg_low=0.

In some examples, the power reserved for the Uu uplink transmission Pu is fixed to be 0, i.e., there is no power reserved for the Uu uplink transmission. In this case, Pu may not be configured. For facilitating the description, the following is described according to the case that Pu is configured. However, the description may include the case that Pu is not configured.

In some examples, the power reserved for the Uu uplink transmission Pu can not distinguish the type of the V2X services, i.e., only one Pu is configured for Uu uplink transmission.

In some examples, the power reserved for the Uu uplink transmission Pu may be configured respectively according to the types of the V2X services. For example, the Pu corresponding to the V2X service with a higher priority is lower. In a special case, for the service of which PPPP exceeds the predefined PPPP threshold, Pu=0.

Specific implementations are carried out according to one or more of the nine methods below.

(1) All the subframes in the V2X resource pool are the first type of subframe. The UE reserves the power Pg for the V2X transmission. And, if the subframe of the Uu corresponding to the subframe of the V2X transmission is the Uu uplink subframe, the UE also reserves the power Pu for the Uu uplink transmission.

Then, if subframe $t_{m1}$ or subframe $t_{m1}-1$ belongs to the V2X resource pool, the maximum power Pu2 available for the Uu uplink transmission in subframe $t_{n1}$ is Pu2=min (Pcmax−Pg1,Pcmax−Pg0), wherein, Pcmax is the maximum transmission power of the UE, Pg1 is the power actually used in the V2X transmission of subframe $t_{m1}-1$ overlapping with the start position of subframe $t_{n1}$. If there is no V2X transmission in subframe $t_{m1}-1$, Pg1=0, wherein Pg0 is the power reserved for subframe $t_{m1}$. If subframe $t_{m1}$ is the first type of subframe, i.e., the subframe in the V2X resource pool, Pg0=Pg, wherein Pg is configured by the base station. If subframe $t_{m1}$ is not the first type of subframe, Pg0=0. When the power required by the uplink transmission exceeds Pu2, the corresponding Uu uplink transmission power may be reduced according to the LTE existing priority criteria, so that the sum of the uplink transmission power on all the carriers does not exceed Pu.

If subframe $t_{m1}$ or subframe $t_{m1}-1$ belongs to the V2X resource pool, the maximum power available for the V2X uplink transmission in subframe $t_{m1}$ is Pg2=min (Pcmax−Pg1,Pcmax−Pu0), wherein, Pcmax is the maximum transmission power of the UE, Pu1 is the power actually used in the Uu uplink transmission of subframe $t_{n1}$ overlapping with the start position of subframe $t_{m1}$. If there is no Uu uplink transmission in subframe $t_{n1}$, Pu1=0, wherein Pu0 is the power reserved for subframe $t_{n1}$+1. If subframe $t_{n1}$+1 is the Uu uplink subframe, Pu0=Pu, wherein Pu is configured by the base station. If subframe $t_{n1}$+1 is not the Uu uplink subframe, Pu0=0. If subframe $t_{n1}$+1 does not belong to the Uu uplink subframes, there is no power reserved for the Uu transmission, as shown in FIG. 8.

This method ensures that the V2X transmission may be always transmitted at a power not smaller than Pg, so that the V2X transmission may be effectively protected. It also ensures that the maximum Pcmax may be assigned to the Uu transmission in the subframe without V2X transmission, while the Uu transmission may be transmitted at a power not smaller than Pu in the subframe where there may be the V2X transmissions.

It is worth noting that the UE would not transmit the V2X service for every resource in the V2X resource pool. Then, when UE does not transmit the V2X transmission, the power reserved for V2X may not be exploited.

(2) The subframe reserved for the V2X transmission by the UE is the first type of subframe. And the UE reserves the power Pg for the V2X transmission. If the Uu subframe corresponding to the subframe of the V2X transmission is the Uu uplink subframe, the UE also reserves the power Pu for the Uu uplink transmission.

As previously described, when the V2X UE performs the resource selection in subframe n, when selecting the idle frequency resource in subframe n+d for the transmission of this data packet, the UE may further reserve the same frequency resource in subframe n+e for transmission of the data packet generated later, wherein e=d+j*P, j=i, 2i, . . . , J*i. i*P expresses a resource occupancy period, P expresses a minimum resource occupancy period, e.g., P=100 ms, J expresses the maximum number of times of resource reservation. In some examples, the subframe of the V2X transmission reserved by the UE in method (2) is subframe n+e.

In some examples, when transmitting PSCCCH/PSSCH in subframe m, the V2X UE may reserve the same frequency resource in subframe m+δ through PSCCH indication. Wherein, subframe m+δ belongs to a set n+e. Then, the subframe of the V2X transmission reserved by the UE in method (2) is subframe m+δ.

In some examples, the subframe of the V2X transmission reserved by the UE is subframe n+e periodically reserved by the UE.

In some examples, there are at most two resource subframes in each period among the subframes of the V2X transmission reserved by the UE.

In some examples, the subframe of the V2X transmission reserved by the UE is the transmission subframe reserved through PSCCH indication.

In some examples, when the Pg is related to the priority of the V2X service, the power Pg for the V2X transmission reserved by the UE is determined by the PPPP type indicated by PSCCH. For example, Pg is determined by the PPPP type indicated by PSCCH transmitted firstly after the resource reselection. In a special case, if Pg_low=0, it indicates that if the priority of PPPP indicated by PSCCH is below the PPPP threshold, the UE may not reserve power for the V2X transmission when assigning power the Uu uplink transmission.

It is not hard to see that the first type of subframes in method (2) is a subset of the first type of subframes in method (1). Then, if subframe $t_{m1}$ or subframe $t_{m1}$−1 belongs to the subframes reserved for the V2X transmission by the UE, the maximum power Pu2 available for the Uu uplink transmission in subframe $t_{n1}$ is Pu2=min(Pcmax−Pg1,Pcmax−Pg0), and the minimum power available is Pu, wherein Pu is the power reserved for the Uu transmission which is configured by the base station. Pcmax is the maximum transmission power of the UE. Pg1 is the power actually used in the V2X transmission of subframe $t_{m1}$−1 overlapping with the start position of subframe $t_{n1}$. If there is no V2X transmission in subframe $t_{m1}$−1, Pg1=0, wherein Pg0 is the power reserved for subframe $t_{m1}$. If subframe $t_{m1}$ is the first type of subframe, i.e., the subframe reserved for the V2X transmission, Pg0=Pg, wherein Pg is configured by the base station. If subframe $t_{m1}$ is not the first type of subframe, Pg0=0. When the power required by the uplink transmission exceeds Pu2, the corresponding Uu uplink transmission power may be reduced according to the LTE existing priority criteria, so that the sum of the Uu uplink transmission power on all the carriers does not exceed Pu.

If subframe $t_{m1}$ or subframe $t_{m1}$−1 belongs to the subframes reserved for the V2X transmission by the UE, the maximum power available for the V2X uplink transmission in subframe $t_{m1}$ is Pg2=min(Pcmax−Pu1,Pcmax−Pu0), wherein, Pcmax is the maximum transmission power of the UE, Pu1 is the power actually used in the Uu uplink transmission of subframe $t_{n1}$ overlapping with the start position of subframe $t_{m1}$. If there is no Uu uplink transmission in subframe $t_{n1}$, Pu1=0, wherein Pu0 is the power reserved for subframe $t_{n1}$+1. If subframe $t_{n1}$+1 is the Uu uplink subframe, Pu0=Pu, wherein Pu is configured by the base station. If subframe $t_{n1}$+1 is not the Uu uplink subframe, Pu0=0. If subframe $t_{n1}$+1 does not belong to the Uu uplink subframes, there is no power reserved for the Uu transmission.

Notably, it may appear that in part of the subframes reserved by the UE for the V2X transmission, there is no V2X transmission. For example, because the service does not arrive at the corresponding time, or there is no service. Then, the power reserved for V2X may not be exploited and there is a waste of power.

FIG. 20 shows an example of this method. The UE is scheduled to transmit the Uu uplink transmission in subframe n+4, and the UE starts preparing the transmission power of subframe n+4 from subframe n. Subsequently, the UE is also scheduled to transmit the Uu uplink transmission in subframe n+5, and the UE starts preparing the transmission power of subframe n+5 from subframe n+1. Before subframe n, the V2X resource reselection timer is cleared to zero, but a new service has not arrived yet. When the UE determines the power for the Uu uplink transmission of subframe n+4, the maximum power available is Pcmax, i.e., there is no power reserved for the V2X transmission, although subframe m+4 is the subframe in the V2X resource pool. Assuming that the actual transmission power of the Uu uplink transmission of subframe n+4 is Pu1. In subframe m, the V2X service arrives, the UE selects to perform the V2X transmission in subframe m+4. Then, the maximum power available for subframe m+4 Pg2=min(Pcmax−Pu1, Pcmax−Pu). Because in subframe m, the UE does not know whether there is the Uu transmission in subframe n+5, and only knows that subframe n+5 is the Uu uplink subframe, there may be a Uu uplink transmission. In this example, there is a Uu transmission in subframe n+5. When the UE starts preparing the Uu uplink transmission power of subframe n+5 from subframe n+1, because the UE has already started preparing the V2X power of subframe m+4 before, thus, although the UE has already known the transmission of subframe m+4 before subframe n+1, the UE may not assign the power for the Uu uplink transmission of subframe n+5 and the V2X transmission of subframe m+4 according to the priority criterion, and determine the power of subframe n+5 according to the remaining power of subframe m+4, which may be the maximum power Pcmax–Pg1. Where Pg1 is the actual power used by the V2X of subframe m+4.

It is not hard to see that this method ensures that the V2X transmission may be always transmitted at a power not smaller than Pg in the subframe reserved by the UE. But the method may not ensure the PSCCH/PSSCH power used for a first TB new transmission or retransmission after resource reselection.

In some examples, when the sum of the powers of PSCCH/PSSCH used for the first TB new transmission or retransmission after the resource reselection and the Uu uplink transmission power exceeds Pcmax, and the priority of the PSCCH/PSSCH is higher than that of the Uu uplink transmission, for example, PPPP exceeds PPPP threshold, the UE assigns power for the PSCCH/PSSCH at first, reduces the Uu uplink transmission power, or drop transmitting the Uu uplink transmission, so that the total power does not exceed Pcmax; if the priority of the PSCCH/PSSCH is lower than that of the Uu uplink transmission, then the UE ensures the power for the Uu uplink transmission at first, and assigns the remaining power to the V2X transmission.

In some examples, when the UE power is limited, the UE performs the resource reselection. And in the resource reselection, the UE does not use the subframes of which power is limited as an optional set. The power being limited may be that the remaining power for the V2X is 0, or the remaining power for the V2X is lower than the power determined by the power control, or the remaining power for the V2X is lower than the power Pg reserved for the V2X configured by the base station. And other criteria are also not excluded.

As shown in FIG. 9, the UE starts preparing the transmission power of subframe $t_{n1}$ from subframe $t_n$. Before that, the V2X resource reselection timer is cleared to zero, but the new service has not arrived yet. When the UE determines the power for the Uu uplink transmission of subframe $t_{n1}$, the maximum power available is Pcmax, i.e., there is no power reserved for the V2X transmission, although subframe $t_{m1}$ is the subframe in the V2X resource pool. Assume that the actual transmission power of the Uu uplink transmission of subframe $t_{n1}$ is Pcmax. In subframe tm, the V2X service arrives. Then, when performing resource reselection, although there is time for the UE to perform the V2X transmission in subframe $t_{m1}$, the UE has already know that there is no remaining power for performing the V2X transmission in subframe $t_{m1}$, and the UE should avoid the subframe, for example, the UE chooses a next subframe in the V2X resource pool, i.e., subframe $t_{m1}+1$ to perform the V2X transmission. Note that the Uu uplink transmission of subframe $t_{n1}+1$, because the UE has determined the V2X transmission of subframe $t_{m1}+1$ in subframe tn+1, then the Uu uplink transmission power of subframe $t_{n1}+1$ and the V2X transmission power of subframe $t_{m1}+1$ may be determined according to the method of block 202-2, i.e., according to the priorities of the V2X transmission of subframe $t_{m1}+1$ and the Uu uplink transmission of subframe $t_{n1}+1$. Or, a simpler method is that the UE determines that the V2X transmission power of subframe $t_{m1}+1$ is Pg1=min (Pcmax–Pu, the power determined by the power control), and the maximum power of the Uu transmission of subframe $t_{n1}+1$ is Pu2=Pcmax–Pg1.

(3) The subframe reserved for the V2X transmission by the UE is the first type of subframe. And assuming that there must be a V2X transmission, the UE assigns the power for the V2X transmission and the Uu uplink transmission according to the predefined priority. Moreover, if the Uu subframe corresponding to the subframe of the V2X transmission is the Uu uplink subframe, then the UE also reserves the power Pu for the Uu uplink transmission.

A difference from method (2) is that, in method (2), the maximum power available for the Uu uplink transmission of the subframe reserved for the V2X transmission by the UE $t_{n1}$ Pu2 is Pu2=min (Pcmax–Pg1, Pcmax–Pg0), while in method (3) whether or not to reserve the power is determined according to the priorities of the V2X transmission and the Uu uplink transmission. Specifically, in this method, if the priority of the V2X is higher, the power for the V2X is reserved, and the power reserved is the power required for the V2X transmission last time. If the priority of the V2X is lower, there is no power reserved. The priority relationship may refer to the description of block 202-2. In some examples, the priority of the V2X transmission may be determined by the PPPP indicated by the first PSCCH after the resource reselection, or determined by the PPPP indicated by the PSCCH received last period recently. For example, if the PPPP is larger than the PPPP threshold, the priority of the V2X is higher than that of the Uu uplink transmission. In this case, assuming that subframe $t_{m1}-1$ or subframe $t_{m1}$ has the V2X transmission with a higher priority, and then if the sum of all the transmission power exceeds the maximum transmission power, the Uu uplink transmission power of the subframe $t_{n1}$ is reduced, so that the power does not exceed Pcmax–Pg (the power required by the V2X transmission last time).

As shown in FIG. 10, subframe m+3 is not the subframe reserved for V2X by the UE, and subframe m+4 is the subframe reserved for V2X by the UE, then the Uu uplink transmission power of subframe n is, not the assumed power Pg configured by the base station reserved for subframe m+4, but the power assigned for the V2X transmission of subframe m+4 and the Uu uplink transmission of subframe n+4 respectively according to the method of block 202-2, i.e., the channel priority. For example, if the priority of the V2X transmission is higher, then the UE ensures the power for the V2X transmission at first, for example, the power required for the V2X is Pg1, and the power for the Uu is assigned in the remaining power Pcmax–Pg1. If the priority of the Uu uplink transmission is higher, then the power for the Uu transmission is ensured at first, and the remaining power is assigned to the V2X.

In some examples, whether to reserve power or not is determined according to the priorities of the V2X transmission and the Uu uplink transmission. If the priority of the V2X is higher, power for the V2X is reserved, and the power reserved is the power required for the V2X transmission last time. If the priority of the V2X is lower, the power Pg configured for the V2X transmission according to the method of (2) is reserved. Pg is configured by a higher layer, and is not the V2X transmission power last time.

In some examples, the power required by the V2X transmission last time is the power required by the V2X transmission without considering the power limitation.

It is worth noting that the V2X transmission power may be different from that of the V2X transmission last time due to the change of path loss or the solution of congestion. In some examples, if the V2X transmission power exceeds that of the V2X transmission last time, i.e., the power reserved, the UE performs transmission in accordance with the power reserved. In some examples, the power of the V2X transmission before the power adjustment equals to that of the V2X transmission last time before the power adjustment. In some examples, if there is time for the UE to adjust the power, the UE determines the V2X transmission power according to the V2X transmission power last time, and then further adjusts the V2X transmission power later, so that the sum of all the transmission power does not exceed the maximum transmission power of the UE, or the UE transmits the V2X in accordance with the power required, and drop transmitting or reduces the Uu uplink transmission power.

In some examples, if the power of the V2X transmission before the power adjustment is larger than Pcmax of the subframe $t_{n1}$, the Uu uplink transmission power may be assigned 0.

Similar to method (2), it may appear that in part of the subframes reserved by the UE for the V2X transmission, there is no V2X transmission. If the power for the V2X transmission is assigned and the Uu uplink transmission power is reduced, there is a waste of power.

Similarly to method (2), this method ensures that the V2X transmission may be always transmitted at a power not smaller than the V2X transmission power last time in the subframe reserved by the UE. But the method may not ensure that the PSCCH/PSSCH power used for the first TB new transmission and/or retransmission after resource reselection. To solve this problem, a method similar to method (2) is adopted, when the sum of PSCCH/PSSCH power used for the first TB new transmission and/or retransmission after resource reselection and the Uu uplink transmission power exceeds Pcmax, and the priority of the PSCCH/PSSCH is higher than that of the Uu uplink transmission, for example, PPPP exceeds PPPP threshold, the UE assigns power for the PSCCH/PSSCH at first, reduces the Uu uplink transmission power, or drops transmitting the Uu uplink transmission, so that the total power does not exceed Pcmax. If the priority of the PSCCH/PSSCH is lower than that of the Uu uplink transmission, the UE ensures the power for the Uu uplink transmission at first, and assigns the remaining power to the V2X transmission. In some examples, when the UE power is limited, the UE performs the resource reselection, and the UE does not use the subframes of which power is limited as an optional set. The power being limited may be that the remaining power for the V2X is 0, or the remaining power for the V2X is lower than the power determined by the power control, or the remaining power for the V2X is lower than the power Pg reserved for the V2X configured by the base station, other criteria are also not excluded.

(4) If after the resource reselection timer is cleared to zero, a first V2X service has not arrived yet, the first type of subframe is the subframe included by the V2X resource pool, and then the UE reserves power Pg for the V2X transmission. If a first V2X TB after resource reselection has been transmitted, the subframe reserved for the V2X transmission by the UE is the first type of subframe, and the UE reserves power Pg for the V2X transmission. For the other subframes, the UE does not reserve power for the V2X transmission. And, if the Uu subframe corresponding to the subframe of the V2X transmission is the Uu uplink subframe, the UE also reserves the power Pu for the Uu uplink transmission.

It is not hard to see that for the subframe reserved for the V2X transmission by the UE, method (4) and method (2) are dealt with in the same way. The PSCCH/PSSCH used for the first TB new transmission and retransmission after resource reselection is dealt with in different ways. In method (2), the power for the PSCCH/PSSCH used for the first TB new transmission and retransmission after resource reselection is not reserved. In method (4), the power is reserved. The advantage of this is to avoid that, in method (2), when the power is limited, the PSCCH/PSSCH used for the first TB new transmission and retransmission after resource reselection may not select the subframe of which the power is limited.

A difference from method (1) is that, in method (1), no matter whether the first V2X service has not arrived yet after the resource reselection timer is cleared to zero, or the first TB transmission has completed after the resource reselection timer is cleared to zero, the UE reserves power for the subframe in the V2X resource pool. In method (4), when the first V2X service does not arrived yet after the resource reselection timer is cleared to zero, the UE only reserves power for the subframe in the V2X resource pool, and when the first TB transmission has completed after the resource reselection timer is cleared to zero, the UE only reserves power for the V2X subframe reserved.

As shown in FIG. 11, before subframe $t_n$ starts, the UE resource reselection timer is cleared to zero, but the V2X new service has not arrived, until subframe tm and the V2X service arrives. Subframe $t_{m1}-1$ is not a subframe of the V2X resource pool, and subframe $t_{m1}$ is a subframe of the V2X resource pool, so the power Pg is reserved for subframe $t_{m1}$. The maximum power available for the Uu uplink transmission of subframe $t_{n1}$ Pu2 is Pu2=Pcmax−Pg. If the UE transmits the V2X transmission in subframe $t_{m1}$, the maximum power available for the V2X transmission Pg2 is Pg2=min (Pcmax−Pu1, Pcmax−Pu0). Wherein Pu1 is the actual transmission power of the Uu uplink transmission of subframe $t_{n1}$, and Pu0 is the power reserved for subframe $t_{n1}+1$. If subframe $t_{n1}+1$ is the Uu uplink subframe, then Pu0=Pu, if not, then Pu0=0.

(5) If after the resource reselection timer is cleared to zero, the first V2X service has not arrived yet, the first type of subframe is the subframe included by the V2X resource pool, and then the UE reserves power Pg for the V2X transmission. If the first V2X TB after the resource reselection has been transmitted, the subframe reserved for the V2X transmission by the UE is the first type of subframe, assuming that there must be the V2X transmission, the UE assigns the power for the V2X transmission and the Uu uplink transmission according to the predefined priority, for the other subframes, the UE does not reserve power for the V2X transmission. Moreover, if the Uu subframe corresponding to the subframe of the V2X transmission is the Uu uplink subframe, then the UE also reserves the power Pu for the Uu uplink transmission.

It is not hard to see that for the subframe reserved for the V2X transmission by the UE, method (5) and method (3) are dealt with in the same way. The PSCCH/PSSCH used for the first TB new transmission and retransmission after resource reselection is dealt with in different ways.

(6) Subframes of all V2X gaps are the first type of subframe. The UE reserves the power Pg for the V2X gap. Moreover, if the Uu subframe corresponding to the subframe of the V2X transmission is the Uu uplink subframe, the UE also reserves the power Pu for the Uu uplink transmission.

In some examples, the V2X gap is a subset of the V2X resource pool.

If subframe $t_{m1}$ or subframe $t_{m1}-1$ belongs to the V2X gap, the maximum power available for the Uu uplink transmission in subframe $t_{n1}$ Pu2 is Pu2=min(Pcmax−Pg1, Pcmax−Pg0), wherein, Pcmax is the maximum transmission power of the UE, Pg1 is the power actually used in the V2X transmission of subframe $t_{m1}$−1 overlapping with the start position of subframe $t_{n1}$. If there is no V2X transmission in subframe $t_{m1}$−1, Pg1=0, wherein Pg0 is the power reserved for subframe $t_{m1}$. If subframe $t_{m1}$ is the first type of subframe, i.e., the subframe of the V2X gap, Pg0=Pg, wherein Pg is configured by the base station. If subframe $t_{m1}$ is not the first type of subframe, Pg0=0. When the power required by the uplink transmission exceeds Pu2, the corresponding Uu uplink transmission power may be reduced according to the LTE existing priority criteria, so that the sum of the uplink transmission power on all the carriers does not exceed Pu.

(7) According to one or more of method (1)~(5), the UE determines the first type of subframe and reserves the power. Moreover, when part or all of subframe $t_{n1}$ and subframe $t_{m1}$−1 or subframe $t_{m1}$ overlapping with subframe $t_{n1}$ falls into the V2X gap, and the UE power is limited, according to the predefined priority, the UE assigns the power for the transmission with a higher priority, adjusts the power for the transmission with a lower priority, so that the total power does not exceed Pcmax. When assigning the power for the transmission with a higher priority, the UE does not consider reserving power for the transmission with a lower priority and/or the subframe having a backward transmission time. In the standard, the specific method of adjusting the power for the transmission with a lower priority may not be limited. The priorities may be determined in accordance with the priorities in block 202-2, or the priority of any type of service or channel of the V2X is higher than that of the Uu uplink transmission.

In some examples, the V2X gap is a subset of the V2X resource pool.

In some examples, the transmission with a higher priority is a first type of the V2X service in block 202-2. A second type of the V2X service and the Uu uplink transmission belong to the transmission with a lower priority. That is, when the UE power is limited, if there is the V2X transmission of the first type of V2X service, the UE assigns power for the V2X transmission of the first type of V2X service at first, if there is only V2X of the second type of the V2X service and/or the Uu uplink transmission, the UE assigns power according to method (1)~(5).

It is worth noting that in the V2X gap, regardless of whether the UE determines there is all or part of overlapping the transmission with a higher priority when preparing the power of the transmission with a lower priority, the UE is required to ensure that the power of the transmission with a higher priority, and for the transmission with a lower priority, the UE may drop the transmission, or reduce the transmission power of the transmission with a lower priority of the overlapping part (if the UE power in a transmission time is variable, for example, the power in a subframe does not require to change), or adjust the transmission power of the transmission with a lower priority in the whole transmission time (if the UE has the ability to adjust the power of the whole subframe), so that in the process of the whole transmission, the power does not exceed the maximum transmission power Pcmax. In the standard, the specific method of adjusting power for the transmission with a lower priority may not be limited.

For example, after the V2X resource is reselected, the first TB is transmitted in subframe $t_{m1}$. Subframe $t_{m1}$ belongs to the V2X gap, but does not belong to the V2X subframe reserved by the UE. According to method (2), the UE does not reserve power for the V2X in subframe $t_{m1}$. If the second half of subframe $t_{n1}$ overlaps with subframe $t_{m1}$, when the UE prepares the power for the Uu uplink transmission of subframe $t_{n1}$, the maximum power available is Pcmax, i.e., the reserved power Pg is not taken into consideration. Assuming that the power of the Uu uplink transmission for subframe $t_{n1}$ prepared by the UE is Pu1, Pcmax−Pg<Pu1<Pcmax. But after the UE starts to prepare the power of the Uu uplink transmission of subframe $t_{n1}$, the UE determines to perform V2X transmission in subframe $t_{m1}$, and the priority of the V2X service is higher, such as the DENM service, then, the UE has to ensures the power of the V2X service in subframe $t_{m1}$, for example, the required power is Pg1, but Pg1+Pu1 exceeds Pcmax, the UE has to reduce the uplink transmission power of subframe $t_{n1}$, so that the power of the overlapping part of subframe $t_{m1}$ and subframe $t_{n1}$, i.e., Pg1+Pu1, does not exceed Pcmax.

Moreover, the maximum for Pg1 is Pcmax, and there is no need to reserve power for the Uu uplink transmission of subframe $t_{n1}$+1.

(8) When assigning power for the Uu uplink transmission, the reserved power for the V2X transmission is 0. When assigning power for the V2X transmission, the reserved power for the Uu uplink transmission is also 0. When part or all of the Uu uplink transmission and the V2X transmission overlap, and the power of UE is limited, according to the predefined priority, the UE assigns the power for the transmission with a higher priority, adjusts the power for the transmission with a lower priority, so that the total power does not exceed Pcmax. When assigning the power for the transmission with a higher priority, the UE does not consider reserving power for the transmission with a lower priority and/or the subframe having a backward transmission time. In the standard, the specific method of adjusting power for the transmission with a lower priority may not be limited, for example, may be adjusting power, or dropping the transmission. When there are several Uu uplink carriers, how to drop at least one of the Uu uplink carriers is determined according to the method in the fourth example. The priorities may be determined in accordance with the priorities in block 202-2.

In some examples, the transmission with a higher priority is the first type of the V2X service in block 202-2. The second type of the V2X service and the Uu uplink transmission belong to the transmission with a lower priority. That is, when the UE power is limited, if there is the V2X transmission of the first type of V2X service, the UE assigns power for the V2X transmission of the first type of V2X service at first.

Moreover, in some examples, when part or all of the Uu uplink transmission and the V2X transmission overlap, part or all of the V2X transmission falls in the V2X gap, and the UE power is limited, according to the predefined priority, the UE assigns the power for the transmission with a higher priority, adjusts the power for the transmission with a lower priority, so that the total power does not exceed Pcmax. The priorities may be determined in accordance with the priorities in block 202-2, or the priority of any transmission of the V2X is higher than that of the Uu uplink transmission. In the subframes outside the V2X gap, when assigning power for the Uu uplink transmission, the UE does not consider reserving power for the V2X transmission, i.e., performs the Uu uplink transmission at first.

As shown in FIG. 22, the Uu uplink carrier is not synchronized with the V2X carrier. The UE is scheduled to transmit the Uu uplink transmission in subframe n+4, and the UE starts preparing the transmission power of subframe n+4 from subframe n. Subsequently, in subframe m, the V2X service arrives, the UE performs the V2X transmission in subframe m+4. Then, the UE is also scheduled to transmit the Uu uplink transmission in subframe n+5, and the UE starts preparing transmission power of subframe n+5 from subframe n+1. When the UE determines the power for the Uu uplink transmission of subframe n+4, the maximum power available is Pcmax, i.e., there is no power reserved for the V2X transmission, although subframe m+4 is the subframe in the V2X resource pool. Assume that the actual transmission power of the Uu uplink transmission of subframe n+4 is Pu1. If the priority of the V2X service is higher than that of the Uu uplink transmission, for example, the V2X service indicated by the scheduling grant provided by the higher layer is the DENM service, the UE has to ensure the power of the V2X service in subframe m+4, for example, the required power is Pg1, but Pg1+Pu1 exceeds Pcmax, the UE has to reduce the Uu uplink transmission power of subframe n+4, so that the power of the overlapping part of subframe m+4 and subframe n+4, i.e., Pg1+Pu1, does not exceed Pcmax. If the UE has the ability to change the Uu uplink transmission power of subframe n+4 after determining the V2X transmission, for example, the time of the UE adjusting the power is only 1 ms, the UE may determine the Uu uplink transmission power of subframe n+4 is Pcmax–Pg1. If the UE is not capable of changing the Uu uplink transmission power of subframe n+4 after determining the V2X transmission, for example, the time of the UE adjusting the power is longer, the UE may reduce the Uu uplink transmission power of the second half of subframe n+4, so that the power of the overlapping part of subframe m+4 and subframe n+4 does not exceed Pcmax–Pg1, or the UE may drop transmitting the whole subframe n+4, or drop the Uu uplink transmission of part of subframe n+4. For the Uu uplink transmission of subframe n+5, in this example, the UE starts preparing the power after the V2X service arrives, thus, if the priority of the V2X service is higher, then the UE may determine that the maximum power of the Uu uplink transmission of the whole subframe n+5 does not exceed Pcmax–Pg1 when preparing the power.

(9) According to one or more of method (1)~(5), the UE determines the first type of subframe and reserves the power. When the UE power is limited, according to the predefined priority, the power required by the transmission with a higher priority exceeds the power reserved, and then the UE assigns the power for the transmission having a higher priority, adjusts the power for the transmission with a lower priority, so that the total power does not exceed Pcmax. When assigning the power for the transmission with a higher priority, the UE does not consider reserving power for the transmission with a lower priority and/or the subframe having a backward transmission time. In the standard, the specific method of adjusting power for the transmission with a lower priority may not be limited. The priorities may be determined in accordance with the priorities in block 202-2. It is worth noting that regardless of whether the UE determines there is all or part of overlapping transmission with a higher priority when preparing the transmission with a lower priority, the UE is required to ensure that the power of the transmission with a higher priority, and for the transmission with a lower priority, the UE may drop the transmission, when there are several Uu uplink carriers, how to drop at least one of the Uu uplink carriers is determined according to the method in the fourth example; or the UE may reduce the transmission power of the transmission with a lower priority of the overlapping part, or adjust the transmission power of the transmission with a lower priority in the whole transmission time, so that in the process of the transmission, the power does not exceed the maximum transmission power Pcmax.

In some examples, the transmission with a higher priority is the first type of the V2X service in block 202-2. Both the second type of the V2X service and the Uu uplink transmission belong to the transmission with a lower priority. That is, when the UE power is limited, if there is the V2X transmission of the first type of V2X service, the UE assigns power for the V2X transmission of the first type of V2X service at first, if there is only V2X of the second type of the V2X service and/or the Uu uplink transmission, the UE assigns the power according to method (1)~(5).

For example, on the Uu uplink carrier, the UE receives the UL grant of the Uu uplink transmission of subframe n+4 in subframe n, subframe n+4 belongs to the V2X resource pool, so the maximum power available is Pcmax–Pg when the UE prepares the power for the Uu uplink transmission. Assuming that in subframe n+2 of the V2X uplink carrier, the V2X service arrives, V2X is transmitted in subframe n+4, and the V2X service is a service with a higher priority, i.e., the priority of the V2X transmission is higher than that of the Uu uplink transmission. Then, assuming that the power for the Uu uplink transmission is Pu2, the power for the V2X transmission is Pg2, Pg2>Pcmax–Pu2. Then the UE needs to assign the power Pg2 for the V2X transmission, and drop the Uu uplink transmission. If the power required by the V2X transmission Pg2≤Pcmax–Pu2, the UE may transmit V2X according to the power Pg2, and transmit the Uu uplink transmission normally.

In block 302-3, if there are potentially both the Uu uplink transmission and the V2X transmission, when assigning power for the Uu uplink transmission, the power for the V2X transmission is required to be reserved, when assigning power for the V2X transmission, the power for the Uu uplink transmission is required to be reserved. And, according to the priorities in block 202-2, the remaining power is assigned for the V2X and the Uu uplink transmission.

Wherein, the subframe of the reserved power may be determined according to the method of block 302-2. And in these subframes, the remaining power is assigned for the V2X and the Uu uplink transmission according to the priorities. That is to say, when the power is assigned according to the priorities, it is required to ensure the transmission with a lower priority, and at least the reserved power may be assigned. For example, the priority of V2X is higher than that of the Uu uplink transmission, and the power of the Uu uplink transmission is reduced, if the power required by the Uu uplink transmission is larger than Pu, then the power available for the Uu uplink transmission is Pu.

In block 303, the UE performs the Uu uplink transmission and/or the V2X transmission in subframe $t_{n1}$ or subframe $t_{m1}$ based on the power determined in block 302.

A Third Example

FIG. 4 is a flowchart of the present application.

The example applies to the case that the V2X carrier is synchronized with the Uu uplink carrier, and is also applicable to non synchronization case.

A major difference from the second example is that the V2X power is assigned differently.

In some examples, if the minimum time delay $X_1$ from the arriving of the V2X service to the transmitting of the PSCCH/PSSCH on the selected resource in V2X communication is smaller than the minimum delay $X_3$ required by the UE for preparing the uplink transmission PUSCH in Uu communication (further, in specific implementations, it may be that the minimum time delay $Y_1$ of the UE adjusting the PSCCH/PSSCH transmission power in V2X communication is smaller than the minimum delay $Y_3$ required by the UE preparing the uplink transmission PUSCH in Uu communication), the UE may accurately determine there is the Uu uplink transmission in the same subframe when determining the V2X transmission power. In some examples, if the Uu uplink transmission power has been determined in the subframe, the maximum power available for V2X is Pcmax−Pu1, wherein Pu1 is the power determined for the Uu uplink transmission in the same subframe. If it is determined that there is no Uu uplink transmission in the subframe, the maximum power available for V2X is Pcmax. In some examples, if the Uu uplink transmission power has been determined in the subframe, when the UE power is limited, and the priority of the V2X transmission is higher than that of the Uu uplink transmission (the method of determining the priorities may refer to block 202-2), the maximum power available for V2X is Pcmax, i.e., the power of the V2X transmission is ensured at first, the UE needs to adjust the transmission power of the Uu uplink transmission, so that the total power does not exceed Pcmax. Specifically, how to adjust the Uu uplink transmission power is not limited. For example, the UE may drop transmitting the entire Uu uplink subframe, or reduce the transmission power of Uu uplink transmission of the part overlapping with the V2X transmission (if UE power in a transmission time is variable, for example, the power in a subframe does not require to change), or adjust the transmission power of the Uu uplink transmission in the entire transmission time (if the UE has the ability to adjust the power of the whole subframe), so that in the process of the entire transmission, the power of the Uu uplink transmission and the V2X transmission does not exceed the UE maximum transmission power Pcmax. If it has been determined that there is no Uu uplink transmission in the subframe, the maximum power available for V2X is Pcmax.

It is worth noting that since when determining the V2X transmission power, the UE must have determined the Uu uplink transmission in the same subframe, the UE may avoid both transmitting the Uu uplink transmission and the V2X transmission in a subframe of which the power is not enough. The UE may select a subframe of which the power is not limited, or select a subframe in which there is time for the UE to adjust the Uu uplink transmission power of the corresponding subframe, for example, the V2X transmission may select the subframe in which the time delay from the V2X service arriving to transmitting PSCCH/PSSCH on the selected resource is larger than the time delay of preparing the Uu uplink transmission power to transmit the V2X.

For the Uu uplink transmission power, the processing mode is as follows:

In block 401, in subframe $t_n$, the UE judges whether it is determined that the V2X transmission is performed in subframe $t_{n1}$. If the judgment result is that it is certain to perform V2X transmission, proceed with block 402-1, otherwise, if the judgment result is that it is certain not to perform the V2X transmission, proceed with block 402-2, otherwise, proceed with block 402-3.

Wherein, subframe $t_{n1}$ is the subframe where the UE transmits the Uu uplink data. Subframe $t_n$ is the time point of the UE starting preparing the Uu uplink data power scheduled after the UE receiving the UL grant scheduling the Uu uplink data. Subframe $t_n$ is before subframe $t_{n1}$, and the time difference $X_5$ is larger than or equal to the minimum time delay $Y_3$ of adjusting power.

In some examples, the carrier used for the V2X transmission and the carrier used for the Uu uplink transmission are different carriers.

In some examples, before the UE starts preparing the uplink transmission power of subframe $t_{n1}$ in subframe $t_n$, if the V2X service has arrived, the UE may determine whether it is certain or not to perform the V2X transmission in subframe $t_{n1}$. If it is certain to perform the V2X transmission, proceed with block 402-1, if it is certain not to perform the V2X transmission, and then proceed with block 402-2.

In some examples, when the actual time delay from the arriving of the V2X service to the transmitting of PSCCH/PSSCH by the UE on the selected resource is larger than the minimum time delay required by the UE preparing the uplink transmission PUSCH power in Uu communication, the UE may determine whether it is certain or not to perform the V2X transmission and/or the Uu uplink transmission in subframe $t_{n1}$. If it is certain to perform the V2X transmission, proceed to block 402-1 (Refer to block 202-2 in the first example), if it is certain not to perform the V2X transmission, and then proceed to block 402-2.

In some examples, when the actual time delay from the arriving of the V2X service to the transmitting of PSCCH/PSSCH by the UE on the selected resource is larger than the minimum time delay required by the UE for preparing the uplink transmission PUSCH power in Uu communication, proceed to block 402-3.

As shown in FIG. 12. The UE receives the UL grant scheduling the Uu uplink transmission in subframe tn−1. And after demodulating the UL grant, the UE starts preparing the Uu uplink transmission power in subframe $t_n$. Assuming that once the transmission power is ready, the Uu uplink transmission power may not be changed. Before the UE starts preparing the Uu uplink transmission power from subframe $t_n$, the V2X service has arrived, as shown in FIG. 12, the V2X service arrives at the beginning of subframe tm−1, i.e., the arrival time is prior to the start of subframe $t_n$. Then, the UE may determine the subframe of the V2X transmission at subframe $t_n$, even before the subframe $t_n$ (after the V2X service arrives in subframe tm−1). For example, V2X is transmitted in the V2X subframe $t_{m1}$−1. Then, the UE may determine that there are both the Uu uplink transmission and partial V2X transmission in subframe $t_{n1}$. In this case, the UE proceeds to block 402-1.

In some examples, if subframe $t_{n1}$ does not belong to the V2X transmission resource pool, it is assumed that there must be no V2X transmission in subframe $t_{n1}$, and then proceed to block 402-2. For the case that the V2X carrier is not synchronized with the Uu uplink carrier, if subframe $t_{m1}$ and subframe $t_{m1}$−1 overlapping with subframe $t_{n1}$ do not fall in the V2X transmission resource pool, it is assumed that subframe $t_{n1}$ does not belong to the V2X transmission resource pool. For the case that the V2X carrier is synchronized with the Uu uplink carrier, if subframe $t_{n1}$ of the V2X carrier does not belong to the V2X transmission resource pool, it is assumed that subframe $t_{n1}$ of the Uu uplink carrier does not belong to the V2X transmission resource pool too.

In some examples, before the UE starts preparing the uplink transmission power of subframe $t_{n1}$ in subframe $t_n$, if the V2X service has not arrived yet, and subframe $t_{n1}$ belongs to the V2X transmission resource pool (synchronization), or at least one of subframe $t_{m1}$ and subframe $t_{m1}$−1 overlapping with subframe $t_{n1}$ belongs to the V2X transmission resource pool, the UE may not be able to determine, whether there is the V2X transmission in subframe $t_{n1}$, and then the UE proceeds to block 402-3.

As shown in FIG. 13, assuming that the Uu uplink carrier is synchronized with the V2X carrier, the minimum time delay from the arriving of the V2X service to the transmitting of PSCCH/PSSCH on the selected resource X6=2 ms, the minimum time delay for preparing the power for the Uu uplink transmission $X_5$=4 ms. Then, the UE starts preparing the Uu uplink transmission power of subframe $t_{n1}$ in subframe $t_n$, while in the subframe tn+2, the V2X service arrives. According to the minimum time delay X6=2 ms, then the UE may transmit V2X in subframe tn+4 (subframe $t_{n1}$). In this example, the UE may not determine in subframe $t_n$ whether there is the V2X transmission in subframe $t_{n1}$ on the V2X carrier.

In block 402-1, the UE performs the power assignment for the Uu uplink transmission and the V2X transmission according to a predefined priority criterion.

The specific process may refer to block 202-2 in the first example.

In block 402-2, the UE performs the power assignment for the Uu uplink transmission only according to the Uu uplink transmission.

Since the UE has determined that there must be no V2X transmission in subframe $t_{n1}$, the UE only needs to perform the power assignment for all the Uu uplink transmissions. If the maximum power is exceeded, then power adjusting is performed according to the power adjusting mechanism of the existing LTE technology CA or DC, so that the sum of all the Uu uplink transmission power does not exceed the UE maximum transmission power.

In block 402-3, if subframe $t_{n1}$ belongs to the first type of subframe, when assigning power for the Uu uplink transmission, the power for the V2X transmission is required to be reserved.

As previously described, for the case of non synchronization, at least one of subframe $t_{m1}$ and subframe $t_{m1}-1$ overlapping with subframe $t_{n1}$ belongs to the first type of the subframe, then when assigning the power for the Uu uplink transmission, the power for the V2X transmission is required to be reserved. And only if both subframe $t_{m1}$ and subframe $t_{m1}-1$ are not the first type of the subframe, the power is not required to be reserved for V2X.

In some examples, the power reserved for the V2X transmission Pg is fixed to be 0, i.e., there is no power reserved for the V2X transmission. In this case, Pg may not be configured. For facilitating the description, the following is described according to the case that Pg is configured. However, the description may include the case that Pg is not configured.

In some examples, the power reserved for the V2X transmission Pg can not distinguish the type of the V2X services, i.e., only one Pg is configured for V2X transmission.

In some examples, the power reserved for the V2X transmission Pg may be configured respectively according to the types of the V2X services. For example, there are 8 types of services in PPPP, 8 Pg may be configured respectively according to the 8 types of services. For another example, a Pg_high is configured for the service of which PPPP exceeds a predefined PPPP threshold, and a Pg_low is configured for the other services, i.e., there are two kinds of Pg configured. In a special case, Pg_low=0.

Specific implementations are carried out according to one or more of the nine methods below.

(1) All the subframes in which there may be a V2X transmission are the first type of subframe. The UE reserves the power Pg for the V2X transmission.

In some examples, all the subframes in which there may be a V2X transmission are the subframes included in the V2X resource pool.

For example, assume that the V2X carrier is synchronized with the Uu uplink carrier. Assume that the minimum time delay of preparing the power for V2X $Y_1$=2 ms, and the minimum time delay of preparing the power for Uu $Y_3$=4 ms. And assume subframe n+2 is not the subframe of the V2X resource pool, and subframe n+3~subframe n+5 are the subframes of V2X resource pool. As shown in FIG. 14, the UE is scheduled to transmit the Uu uplink transmission in subframe n+3, and the UE starts preparing the transmission power of subframe n+3 from subframe n−1. Moreover, the UE is scheduled to transmit the Uu uplink transmission in subframe n+4, and the UE starts preparing the transmission power of subframe n+4 from subframe n. In subframe n+2, the V2X service arrives. The UE may transmit V2X as fast as possible in subframe n+4, and the UE decides to transmit V2X in subframe n+4 and subframe n+5. Then, when preparing the Uu transmission power of subframe n+3 in subframe n−1, the UE needs to reserve the V2X power Pg. That is, the maximum power available for the Uu uplink transmission Pu2 is Pu2=Pcmax−Pg. When preparing the Uu transmission power of subframe n+4 in subframe n, the UE needs to reserve the V2X power Pg, the maximum power available for the Uu uplink transmission Pu2 is Pu2=Pcmax−Pg. When the UE prepares the V2X transmission power of subframe n+4 and subframe n+5, the V2X maximum transmission power of subframe n+4 is Pg2=Pcmax−Pu1. Wherein, Pu1 is the actual power of the Uu transmission of subframe n+4. Because when preparing the V2X transmission power, the UE has already know the Uu uplink transmission power of subframe n+4, the maximum power available for V2X is Pcmax−Pu1, rather than Pcmax−Pu, but. Similarly, when preparing the V2X transmission power of subframe n+5, the UE has already know that there is no Uu transmission in subframe n+5, so the V2X maximum transmission power is Pcmax, rather than Pcmax−Pu.

(2) The subframe reserved for the V2X transmission by the UE is the first type of subframe. The UE reserves the power Pg for the V2X transmission.

In some examples, when the Pg is related to the priority of the V2X service, the power Pg reserved for the V2X transmission by the UE is determined by the PPPP type indicated by PSCCH. For example, Pg is determined by the PPPP type indicated by PSCCH transmitted firstly after the resource reselection. In a special case, if Pg_low=0, it indicates that if the priority of PPPP indicated by PSCCH is lower than the PPPP threshold, then the UE may not reserve power for the V2X transmission when assigning power the Uu uplink transmission.

If the V2X carrier is synchronized with the Uu uplink carrier, subframe $t_{n1}$ belongs to the subframes reserved for the V2X transmission by the UE, the maximum power available for the Uu uplink transmission Pu2 is Pu2=Pcmax−Pg, wherein Pcmax is the maximum transmission power of the UE in subframe $t_{n1}$, Pg is the power reserved for the V2X transmission, which is configured by the base station. When the power required by the uplink transmission exceeds Pu2, the corresponding Uu uplink transmission power may be reduced according to the LTE existing priority criteria, so that the sum of the Uu uplink transmission power on all the carriers does not exceed Pu2.

If the UE is to transmit V2X in subframe $t_{n1}$, the maximum power available is Pcmax−Pu1. Wherein, Pu1 is the actual transmission power of the Uu uplink transmission. Pu1 may be smaller than or equal to Pu. For example, the Uu uplink transmission does not reach the power limit Pu, and the remaining power may be used for the V2X transmission. When the power required for the V2X transmission exceeds Pcmax−Pu1, the power is reduced to Pcmax−Pu1.

If subframe $t_{n1}$ does not belong to the subframes reserved for the V2X transmission by the UE, the UE does not reserve power for the V2X transmission.

If the V2X carrier is not synchronized with the Uu uplink carrier, subframe $t_{m1}$ or subframe $t_{m1}-1$ belongs to the subframes reserved for the V2X transmission by the UE, and the maximum power available for the Uu uplink transmission in subframe $t_{n1}$Pu2 is Pu2=Pcmax−Pg.

As shown in FIG. 15, the UE starts preparing the transmission power of subframe n+3 from subframe n−1. The UE starts preparing the transmission power of subframe n+4 from subframe n, and the UE starts preparing the transmission power of subframe n+5 from subframe n+1° The UE V2X service arrives at subframe m+1, i.e., after subframe n+1 begins. Subframe m+3 and subframe m+5 are the V2X subframes reserved by the UE. Then, when preparing the Uu transmission power of subframe n+3~subframe n+5, the UE needs to consider reserving power for V2X, that is, the maximum power of the Uu transmission is Pu2=Pcmax−Pg. Assume that the minimum time delay of preparing the power for V2X is 2 ms, then the UE transmits V2X in subframe m+3 and subframe m+5. The maximum power of the V2X transmission of the UE in subframe m+3 is Pg2=min (Pcmax−Pu1 of subframe n+3, Pcmax−Pu1 of subframe n+4). Then the maximum transmission power of subframe n+5 is Pg2=Pcmax−Pu1 rather than Pg2=min(Pcmax−Pu1, Pcmax−Pu), wherein Pu1 is the Uu transmission power of subframe n+5, and Pu is the power reserved for Uu configured by the base station. Because in this example, the minimum time delay of the V2X preparing power is 2 ms, that is, in subframe m+3, the UE still has the ability to adjust the V2X power of subframe m+5. Since subframe m+3 is after subframe n+2, it is possible to determine whether there is the Uu uplink transmission in subframe n+6. In this example, although subframe n+6 is the Uu uplink subframe, there is no Uu uplink transmission in subframe n+6.

For example, as shown in FIG. 16, the UE starts preparing the Uu uplink transmission power of subframe n+3 from subframe n−1. The UE starts preparing the uplink transmission power of subframe n+6 from subframe n+2. The UE V2X service arrives at subframe m+1, i.e., after subframe n−1 starts and before subframe n+2 starts. Subframe m+3 and subframe m+5 are the V2X subframes reserved by the UE. Subframe n+4, subframe n+5 are the Uu uplink subframes.

Then, when preparing for the Uu transmission power of subframe n+3, the UE needs to consider reserving the power for V2X, i.e., the maximum power of the Uu transmission is Pu2=Pcmax−Pg. When preparing for the Uu transmission power of subframe n+6, because before subframe n+2 starts the V2X service has arrived and in subframe n+2 the UE can determine there is the V2X transmission in subframe m+5, then, the V2X transmission power of subframe m+5 and the Uu transmission power of subframe n+6 may be determined according to block 202-2 in the first example, i.e., according to the channel priority of V2X and Uu uplink transmission.

In some examples, when the sum of powers of PSCCH/PSSCH used for the first TB new transmission and/or retransmission after the resource reselection and the Uu uplink transmission power exceeds Pcmax, and the priority of the PSCCH/PSSCH is higher than that of the Uu uplink transmission, for example, PPPP exceeds PPPP threshold, the UE may assign the power for the PSCCH/PSSCH at first, and reduce the Uu uplink transmission power, or drop transmitting the Uu uplink transmission, so that the total power does not exceed Pcmax. And if the priority of the PSCCH/PSSCH is lower than that of the Uu uplink transmission, then the UE may ensure the power for the Uu uplink transmission at first, and then assign the remaining power to the V2X transmission.

In some examples, if the power of the UE is limited, when performing the resource reselection, the UE does not use the subframes of which power is limited as an optional set. The power being limited may be that the remaining power for the V2X is 0, or the remaining power for the V2X is lower than the power determined by the power control, or the remaining power for the V2X is lower than the power Pg reserved for the V2X configured by the base station. Moreover, other criteria are also not excluded.

(3) The subframe reserved for the V2X transmission by the UE is the first type of subframe. Assuming that there must be a V2X transmission, the UE assigns the power for the V2X transmission and the Uu uplink transmission according to the predefined priority.

In the subframe reserved for the V2X transmission by the UE, the UE determines whether or not to reserve power according to the priorities of the V2X transmission and the Uu uplink transmission. Specifically, if the priority of the V2X is higher, the UE reserves power for the V2X, and the power reserved is the power required for the V2X transmission last time. If the priority of the V2X is lower, no power is reserved. The priority relationship may be obtained referring to block 202-2. It is worth noting that a difference from (3) of the second example is that if one of the Uu subframes overlapping with the first half or the second half of subframe $t_{m1}$ is not the Uu uplink subframe, the UE may determine the power only according to priorities of the uplink channel of the Uu transmission of the uplink subframe which is the Uu uplink subframe and multi channels of the V2X transmission. If two Uu subframes overlapping with the first half and the second half of subframe $t_{m1}$ are the Uu uplink subframes, the UE may determine the power according to priorities of the uplink channel of the Uu uplink subframe of subframe $t_{n1}$ overlapping with the first half of subframe $t_{m1}$ and the V2X transmission of subframe $t_{m1}$.

As shown in FIG. 17, in subframe m+2, the V2X service arrives and the UE determines that the V2X is transmitted in subframe m+4. Subframe m+3 is not the V2X subframe reserved by the UE, subframe m+4 is the V2X subframe reserved by the UE, then, the Uu uplink transmission power of subframe n is not the assumed power Pg reserved for subframe m+4 configured by the base station. While the powers of the V2X transmission of subframe m+4 and the Uu uplink transmission of subframe n+4 are assigned respectively according to the method of block 202-2, i.e., according to the channel priorities. For example, if the priority of the V2X transmission is higher, the UE ensures the V2X transmission power at first, for example, the V2X transmission power is Pcmax−Pu, and then assigns the remaining power to the Uu, i.e., Pu. If the priority of the Uu uplink transmission is higher, the UE ensures the Uu uplink transmission power at first, and then assigns the remaining power to the V2X. Since the UE in subframe m+2 has already determined that there is no Uu uplink transmission in subframe n+5, the V2X transmission power of subframe m+4 does not need to consider the impact of subframe n+5, i.e., no power is reserved for subframe n+5.

For another example, as shown in FIG. 18, in subframe m+2, the V2X service arrives and the UE determines that the V2X is transmitted in subframe m+4. Subframe m+3 is not the V2X subframe reserved by the UE, subframe m+4 is the V2X subframe reserved by the UE. The UE starts preparing the Uu uplink transmission of subframe n+4 from subframe n, and preparing the Uu uplink transmission of subframe n+5 from subframe n+1. Then, the UE determines the power according to the priorities of the Uu uplink transmission of subframe n+4 and the V2X transmission of subframe m+4. For example, if the priority of the V2X transmission of subframe m+4 is higher, then the UE ensures the V2X transmission power at first, reduces the Uu uplink transmission power of subframe n+4. However, the V2X power of subframe m+4 may only be assigned at most Pcmax−Pu. For subframe n+5, the maximum power is Pcmax−V2X power of subframe m+4. The V2X power of subframe m+4 here is the V2X power determined according to the priorities of the Uu uplink transmission of subframe n+4 and the V2X transmission of subframe m+4.

(4) If after the resource reselection timer is cleared to zero, the first V2X service has not arrived yet, the first type of subframe is the subframe included by the V2X resource pool, and the UE reserves power Pg for the V2X transmission. If the first V2X TB after the resource reselection has been transmitted, the subframe reserved for the V2X transmission by the UE is the first type of subframe, the UE reserves power Pg for the V2X transmission. And for the other subframes, the UE does not reserve power for the V2X transmission.

As shown in FIG. 19, assume that the minimum time delay for preparing the V2X transmission power is 3 ms. Before the subframe n−1 starts, the UE resource reselection timer is cleared to zero, but the new V2X service has not arrived. Until subframe m, the V2X service arrives. Subframe m+3 is a subframe in the V2X resource pool, and the UE transmits the V2X in subframe m+3. The UE starts preparing the Uu uplink transmission power of subframe n+3 from subframe n−1, the maximum power available Pu2 is Pu2=Pcmax−Pg. The maximum power available for the V2X transmission of subframe m+3 is Pg2=Pcmax−Pu1, wherein, Pu1 is the actual transmission power of the Uu uplink transmission of subframe n+3. Since the UE in subframe m+1, has determined that there is no Uu uplink transmission in subframe n+4, and there is no need to reserve power Pu for subframe n+4.

(5) If after the resource reselection timer is cleared to zero, the first V2X service has not arrived yet, the first type of subframe is the subframe included by the V2X resource pool, and the UE reserves power Pg for the V2X transmission. If the first V2X TB after the resource reselection has been transmitted, and the subframe reserved for the V2X transmission by the UE is the first type of subframe, the UE assigns the power for the V2X transmission and the Uu uplink transmission according to the predefined priority assuming that there must be the V2X transmission. And for the other subframes, the UE does not reserve power for the V2X transmission.

(6) Subframes of all V2X gaps are the first type of subframe. The UE reserves the power Pg for the V2X transmission in the subframes of the V2X gap.

(7) According to one of method (1)~(5), the UE determines the first type of subframe and reserves the power Pg for the V2X transmission in the first type of subframe. When subframe $t_{n1}$ belongs to the subframes of V2X gap, there is a V2X transmission overlapping with subframe $t_{n1}$, the UE power is limited, and the priority of the V2X transmission is higher than that of the Uu uplink transmission, the UE ensures the V2X transmission power at first, adjusts the transmission power of the Uu uplink transmission, so that the total power does not exceed Pcmax. Specifically, how to adjust the Uu uplink transmission power is not limited.

In some examples, the transmission of a higher priority may be that of the first type of the V2X service in block 202-2. Both the transmission of the second type of the V2X service and the Uu uplink transmission belong to the transmission with a lower priority. That is, when the UE power is limited, if there is a V2X transmission of the first type of V2X service, the UE assigns power for the V2X transmission of the first type of V2X service at first. And if there is only V2X of the second type of the V2X service and/or the Uu uplink transmission, the UE assigns power according to any of method (1)~(5).

(8) When preparing the Uu uplink transmission power, the UE does not consider reserving power Pg for the V2X transmission. When there is a V2X transmission overlapping with subframe $t_{n1}$, the UE power is limited, and the priority of the V2X transmission is higher than that of the Uu uplink transmission, the UE ensures the V2X transmission power at first, adjusts the transmission power of the Uu uplink transmission, so that the total power does not exceed Pcmax. Specifically, how to adjust the Uu uplink transmission power is not limited. And if the priority of the V2X transmission is lower than or equal to that of the Uu uplink transmission, the UE ensures the Uu uplink transmission power at first.

In some examples, the transmission of a higher priority is that of the first type of the V2X service in block 202-2. Both the transmission of the second type of the V2X service and the Uu uplink transmission belong to the transmission with a lower priority. That is, when the UE power is limited, if there is a V2X transmission of the first type of V2X service, the UE assigns power for the V2X transmission of the first type of V2X service at first. If there is only V2X of the second type of the V2X service and/or the Uu uplink transmission, the UE ensures the Uu uplink transmission power at first.

Moreover, when part or all of the Uu uplink transmission and the V2X transmission overlap, part or all of the V2X transmission falls in the V2X gap, the UE power is limited, and the priority of the V2X transmission is higher than that of the Uu uplink transmission, the UE ensures the V2X transmission power at first, and adjusts the transmission power of the Uu uplink transmission, so that the total power does not exceed Pcmax. Specifically, how to adjust the Uu uplink transmission power is not limited. If the priority of the V2X transmission is lower than or equal to that of the Uu uplink transmission, the UE ensures the Uu uplink transmission power at first. In the subframes outside the V2X gap, when assigning power for the Uu uplink transmission, the UE does not consider reserving power for the V2X transmission, i.e., performs the Uu uplink transmission at first.

(9) According to one of method (1)~(5), the UE determines the first type of subframe and reserves the power Pg for the V2X transmission in the first type of subframe. When there is a V2X transmission overlapping with subframe $t_{n1}$, when the UE power is limited, and the priority of the V2X transmission is higher than that of the Uu uplink transmission, and the power required by the V2X transmission exceeds the reserved power Pg, the UE ensures the V2X transmission power at first, and adjusts the transmission power of the Uu uplink transmission, so that the total power does not exceed Pcmax. Specifically, how to adjust the Uu uplink transmission power is not limited. For example, the UE may drop the Uu uplink transmission. When the priority of the Uu uplink transmission is higher, the Uu uplink transmission power may be determined according to one of method (1)~(5), i.e., the first type of subframe, the maximum available power is Pcmax–Pg, otherwise the maximum available power is Pcmax.

In some examples, the transmission with a higher priority is the transmission of the first type of the V2X service in step 202-2. Both the transmission of the second type of the V2X service and the Uu uplink transmission belong to the transmission with a lower priority. That is, when the UE power is limited, if there is a V2X transmission of the first type of V2X service, the UE assigns power for the V2X transmission of the first type of V2X service at first. And if there is only V2X of the second type of the V2X service and/or the Uu uplink transmission, the UE assigns power according to any of method (1)~(5).

In block 403, the UE performs the Uu uplink transmission in subframe $t_{n1}$ based on the power determined in block 402.

A Fourth Example

In block 2301, the UE judges whether the transmission power is limited in subframe $t_n$. If the transmission power is limited, proceed to block 2302, otherwise, perform the Uu uplink transmission and/or the V2X transmission in subframe $t_n$ according to the transmission power required.

In block 2302, if there are both the V2X transmission and the Uu uplink transmission, and the priority of the V2X transmission is higher than that of the Uu uplink transmission, the UE assigns the power for the V2X transmission at first, and drops at least one of the Uu uplink transmission carriers. If there are both the V2X transmission and the Uu uplink transmission, and the priority of the Uu uplink transmission is higher than that of the V2X transmission, the UE assigns the power for the Uu uplink transmission at first, and drops at least one of the V2X transmission carriers.

In some examples, the V2X transmission and the Uu uplink transmissions may be synchronized or not synchronized. That having both the V2X transmission and the Uu uplink transmission in subframe $t_n$ means that two transmissions at least partially overlap in subframe $t_{n1}$.

In some examples, whether the priority of the V2X transmission is higher than that of the Uu uplink transmission may be determined in accordance with the priority criterion described in the second example of the present application. For example, when the PPPP of the V2X transmission is higher than the predefined PPPP threshold, the V2X transmission is the first priority service, whose priority is higher than that of the Uu uplink transmission.

In some examples, in the current subframe, if there are Uu uplink transmissions of at least two Uu uplink carriers, the UE drops transmitting the Uu uplink carrier with a lower priority according to the predefined priority, so that the total power of the Uu uplink carrier which has already been transmitted and V2X transmission does not exceed the maximum transmission power Pcmax. Wherein, the predefined priority is determined according to the priorities of the existing Uu uplink transmission, such as PUCCH>PUSCH with UCI>PUSCH without UCI. For example, the priority of PRACH is higher than that of the other uplink channels (PUCCH, PUSCH, SRS), the priority of SRS is lower than that of the other uplink channels. When the priorities are the same, according to the predefined criteria, the UE may drop transmitting the part of the Uu uplink carrier, for example, the UE transmits the Uu uplink carrier with a low carrier index with priority.

For example, assume there are two Uu uplink carrier transmissions and the V2X transmission in subframe $t_{n1}$, and the PPPP of the V2X transmission exceeds the PPPP threshold, i.e., the priority is higher than that of the Uu uplink transmission. And assume the UE power is limited. Then, the UE assigns power for the V2X transmission at first, and the maximum available power is Pcmax. Assuming that the power required actually by the V2X transmission is Pg1, the maximum power available for the Uu uplink transmission is Pcmax–Pg1. Assuming that there are two Uu uplink carriers, one carrier is uplink Pcell, transmitting PUCCH, the required power is Pu_1, the other carrier is uplink Scell, transmitting PUSCH, the required power is Pu_2. Both Pu_1 and Pu_2 are smaller than Pcmax–Pg1, but Pu_1+Pu_2 is larger than Pcmax–Pg1. The UE may drop transmitting the uplink Scell and only transmit s the uplink Pcell.

For another example, as shown in FIG. 23, there are two Uu uplink carrier transmissions both in subframe $t_{n1}$ and subframe $t_{n1}+1$, and the V2X transmission in subframe $t_{m1}$ overlaps with subframe $t_{n1}$ and subframe $t_{n1}+1$. The PPPP of the V2X transmission exceeds the PPPP threshold, i.e., the priority is higher than that of the Uu uplink transmission. And the UE power is limited. Assuming that when assigning the Uu uplink power for subframe $t_{n1}$, the UE has not determined whether there is a V2X transmission in subframe $t_{m1}$ or not, but when assigning the Uu uplink power for subframe $t_{n1}+1$, the UE has determined there is a V2X transmission in subframe $t_{m1}$. Then, the UE may reduce the Uu uplink power of subframe $t_{n1}+1$, so that the sum of the power of the Uu uplink transmission and the V2X transmission does not exceed Pcmax. For subframe $t_{n1}$, the UE may only drop transmitting at least one of the Uu uplink carriers, so that the sum of the power of the Uu uplink transmission and the V2X transmission does not exceed Pcmax. Assuming that the power actually required by the V2X transmission is Pg1, the maximum power available for the Uu uplink transmission is Pcmax–Pg1. Assuming that there are two Uu uplink carriers, one carrier is uplink Pcell, which is used for transmitting PUCCH, and the required power of which is Pu_1; the other carrier is uplink Scell, which is used for transmitting PUSCH, and the required power of which is Pu_2. Both Pu_1 and Pu_2 are smaller than Pcmax–Pg1, but Pu_1+Pu_2 is larger than Pcmax–Pg1. The UE may drop transmitting the uplink Scell of subframe $t_{n1}$ and only transmits the uplink Pcell of subframe $t_{n1}$, and then transmits Scell and Pcell of subframe $t_{n1}+1$. If the UE has two Uu uplink carrier transmissions in subframe $t_{n1}$, and does not have Uu uplink carrier transmission in subframe $t_{n1}+1$ or the power is not limited, the Uu transmission of subframe $t_{n1}$ may be also dealt with in accordance with the above method.

For another example, there are two Uu uplink carrier transmissions both in subframe $t_{n1}$ and subframe $t_{n1}+1$, and the V2X transmission in subframe $t_{m1}$ overlaps with subframe $t_{n1}$ and subframe $t_{n1}+1$. The PPPP of the V2X transmission exceeds the PPPP threshold, i.e., the priority is higher than that of the Uu uplink transmission. The UE power is limited. Assuming that when assigning the Uu uplink power for subframe $t_{n1}$ and subframe $t_{n1}+1$, the UE has not determined there is the V2X transmission in subframe $t_{m1}$. Then, for subframe $t_{n1}$ and subframe $t_{n1}+1$, the UE may only drop transmitting at least one of the Uu uplink carriers of subframe $t_{n1}$ and subframe $t_{n1}+1$ respectively, so that the sum of the power of the Uu uplink transmission and the V2X transmission does not exceed Pcmax. The UE may determine to drop the transmission of the Uu uplink carrier is determined according to the priority of the Uu. For example, in subframe $t_{n1}$, PUCCH is transmitted in Pcell, the transmission of PUSCH of Scell is dropped, and in subframe $t_{n1}+1$, the transmission of PUSCH without UCI (PCell) is dropped, and PUSCH with UCI (Scell) is transmitted.

In some examples, in the current subframe, when there are Uu uplink transmissions of at least two Uu uplink carriers, the UE decides to drop the transmission of one or more Uu uplink carriers. And the UE needs to ensure that the number of transmissions of the Uu uplink carriers dropped is the smallest. so Further the UE needs to ensure that the sum of the power of the Uu uplink carriers transmitted and the V2X transmission does not exceed the maximum transmission power Pcmax.

For example, there are two Uu uplink carrier transmissions and the V2X transmission in subframe $t_{n1}$, and the PPPP of the V2X transmission exceeds the PPPP threshold, i.e., the priority is higher than that of the Uu uplink transmission. And the UE power is limited. Then, the UE assigns power for the V2X transmission at first, and the maximum available power is Pcmax. Assuming that the power actually required by the V2X transmission is Pg1, then the maximum power available for the Uu uplink transmission is Pcmax−Pg1. Assuming that there are two Uu uplink carriers, one carrier is uplink Pcell, which is to transmit PUCCH, and the required power of which is Pu_1, the other carrier is uplink Scell, which is to transmit PUSCH, and the required power of which is Pu_2. Pu_1 is larger than Pcmax−Pg1, and Pu_2 is smaller than Pcmax−Pg1. If the UE drops transmitting the uplink Scell, the remaining power Pcmax−Pg1 is still insufficient to transmit the uplink Pcell. But if the UE drops transmitting Pcell, the remaining power Pcmax−Pg1 is sufficient to transmit the uplink Scell. Then, the UE may drop transmitting Pcell, and only transmits the uplink Scell.

In some examples, in the current subframe, there are at least two V2X transmission carriers, the UE may drop transmitting the V2X transmission carrier with a lower priority according to the predefined priority, to ensure that the total power of the V2X transmission which has already been transmitted and the Uu uplink carrier does not exceed the maximum transmission power Pcmax. Wherein, the predefined priority is determined according to the PPPP of the V2X transmission and/or channels of the V2X transmission, such as the priorities of the first example.

In some examples, in the current subframe, there are at least two V2X transmission carriers, and the UE decides to drop the transmission of one or more V2X transmission carriers. And the UE, but needs to ensure that the number of dropping transmitting the V2X transmission carriers is the smallest, moreover, to ensure the sum of the power of the V2X transmission and the Uu uplink transmission does not exceed the maximum transmission power Pcmax.

In some examples, if the UE has enough time to adjust the power of the Uu uplink carrier with a lower priority, there is no need to drop transmitting the uplink carrier, and the UE only needs to reduce the power of the Uu uplink carrier to ensure the sum of the power of the Uu uplink carriers which have been transmitted and the V2X transmission does not exceed the maximum transmission power Pcmax. When reducing the Uu uplink carrier power, it is determined according to the priority of the existing Uu uplink transmission, and not repeated here.

In some examples, if the UE has enough time to adjust the power of the V2X transmission with a lower priority, there is no need to drop transmitting the V2X transmission, and the UE only needs to reduce the power of the V2X transmission to ensure the sum of the power of the Uu uplink carriers which have been transmitted and the V2X transmission does not exceed the maximum transmission power Pcmax.

A Fifth Example

Corresponding to the above methods, the present application also discloses a device. The device may be used to implement the above methods. As shown in FIG. 21, the device may include a judging module, a power controlling module and a transmitting module.

The judging module is to judge, at subframe $t_n$, whether there is a V2X transmission in subframe $t_{n1}$.

The power controlling module is to control the power of the Uu uplink transmission and/or the V2X transmission based on predefined criteria according to the results of the judging module.

The transmitting module is to perform the Uu uplink channel transmission and/or the V2X transmission based on the power determined by the power controlling module.

Those ordinary skilled in the art may understand that all or part of steps for implementing the method embodiments above may be finished by instructing related hardware through programs. The programs may be stored in a computer or readable storage medium. And when being executed, the program may include one or combination thereof of the steps of the method embodiments.

Herein, respective function units in all embodiments of the present application may be integrated in one processing module, or respective units exist physically, or two or more units are integrated in one module. The integrated module may be implemented by adopting a hardware form or implemented by adopting a form of software function module. The integrated module may be stored in one computer-readable storage medium when implemented in the form of software function module and sold or used as an independent product.

The storage medium mentioned above may be a read-only storage, a magnetic disk or compact disc.

The abovementioned is merely preferable embodiments of the present application, which cannot be used to limit the present application. And any modifications, equivalent replacements and improvements made within a spirit and principle of the present application should fall within a protective scope of the present application.

The invention claimed is:

1. A method of power control by a terminal in a wireless communication system, the method comprising:
   identifying that a sidelink transmission and an uplink transmission are overlapped in time;
   comparing a priority value of the sidelink transmission with a configured priority threshold value;
   adjusting a power of the uplink transmission or a power of the sidelink transmission on an overlapped portion based on the result of the comparison; and,
   transmitting the sidelink transmission and the uplink transmission based on the adjusted power of the sidelink transmission or adjusted power of the uplink transmission,
   wherein the power of the uplink transmission on the overlapped portion is adjusted, in case that the priority value of the sidelink transmission is less than the configured priority threshold value.

2. The method of claim 1, wherein the power of the sidelink transmission on the overlapped portion is adjusted, in case that the priority value of the sidelink transmission is greater than or equal to the configured priority threshold value.

3. The method of claim 1, wherein the sidelink transmission is performed on a first carrier and the uplink transmission is performed on a second carrier.

4. The method of claim 1, wherein a total power of the sidelink transmission and the uplink transmission transmitted on the overlapped portion does not exceed a maximum transmission power configured for the terminal.

5. The method of claim 1, wherein the sidelink transmission is in a transmission mode 3 or 4.

6. A terminal of performing power control in a wireless communication system, comprising:
   a transceiver; and
   a controller configured to:
      identify that a sidelink transmission and an uplink transmission are overlapped in time;
      compare a priority value of the sidelink transmission with a configured priority threshold value; and
      adjust a power of the uplink transmission or a power of the sidelink transmission on an overlapped portion based on the result of the comparison; and
      transmit, via the transceiver, the sidelink transmission and the uplink transmission based on the adjusted power of the sidelink transmission or adjusted power of the uplink transmission,
   wherein the power of the uplink transmission on the overlapped portion is adjusted, in case that the priority value of the sidelink transmission is less than the configured priority threshold value.

7. The terminal of claim 6, wherein the power of the sidelink transmission on the overlapped portion is adjusted, in case that the priority value of the sidelink transmission is greater than or equal to the configured priority threshold value.

8. The terminal of claim 6, wherein the controller is further configured to control the transceiver to perform the sidelink transmission on a first carrier and the uplink transmission on a second carrier.

9. The terminal of claim 6, wherein a total power of the sidelink transmission and the uplink transmission transmitted on the overlapped portion does not exceed a maximum transmission power configured for the terminal.

10. The terminal of claim 6, wherein the sidelink transmission is in a transmission mode 3 or 4.

* * * * *